United States Patent
Alonso Fernández et al.

(10) Patent No.: US 8,042,941 B2
(45) Date of Patent: Oct. 25, 2011

(54) LENS WITH CONTINUOUS POWER GRADATION

(75) Inventors: José Alonso Fernández, Madrid (ES); Daniel Crespo Vázquez, Madrid (ES); Thomas A. Balch, Ranchos Palos Verdes, CA (US); Nancy L. S. Yamasaki, Long Beach, CA (US)

(73) Assignee: Indizen Optical Technologies, S.I., Madrid (ES)

( * ) Notice: Subject to any disclaimer, the term of this patent is extended or adjusted under 35 U.S.C. 154(b) by 0 days.

(21) Appl. No.: 12/697,060

(22) Filed: Jan. 29, 2010

(65) Prior Publication Data
US 2011/0187993 A1    Aug. 4, 2011

(51) Int. Cl.
*G02C 7/06* (2006.01)
(52) U.S. Cl. .................. 351/169; 351/161; 351/168
(58) Field of Classification Search .................. 351/161, 351/164, 168, 169, 171, 172
See application file for complete search history.

(56) References Cited

U.S. PATENT DOCUMENTS

| | | |
|---|---|---|
| 2,109,474 A | 3/1938 | Evans |
| 2,475,275 A | 7/1949 | Birchall |
| 2,878,721 A | 3/1959 | Kanolt |
| 3,711,191 A | 1/1973 | Tagnon |
| 3,797,922 A | 3/1974 | Plummer |
| 4,253,747 A | 3/1981 | Maitenaz |
| 4,472,036 A | 9/1984 | Kitani |
| 4,538,887 A | 9/1985 | Bristol |
| 4,580,882 A | 4/1986 | Nachman et al. |
| 4,861,153 A | 8/1989 | Winthrop |
| 4,946,270 A | 8/1990 | Guilino |
| 4,950,057 A | 8/1990 | Shirayanagi |
| 5,327,181 A | 7/1994 | Waido |
| 5,726,734 A | 3/1998 | Winthrop |
| 5,847,803 A | 12/1998 | Gupta et al. |
| 5,926,250 A | 7/1999 | Mukaiyama et al. |
| 6,019,470 A | 2/2000 | Mukaiyama et al. |

(Continued)

FOREIGN PATENT DOCUMENTS
DE    102008022010    11/2009
(Continued)

OTHER PUBLICATIONS

Jim Sheedy, Raymond F. Hardy, and John R. Hayes, Progressive addition lenses—measurements and ratings, Optometry, Jan. 2006, pp. 23-39, vol. 77, Elsevier, New York, USA.

(Continued)

*Primary Examiner* — Darryl J Collins
(74) *Attorney, Agent, or Firm* — Sheppard, Mullin, Richter & Hampton LLP

(57) ABSTRACT

The present invention is embodied in ophthalmic lenses having a first lens surface that is described by a continuous, gradual increase in optical power that proceeds without inflection points of discontinuities across substantially the entire useable optical area of this lens surface, and an opposite surface of the lens configured to cooperate with the power gradation of the first surface to provide a desired prescription, including at least one stabilized area of optical power. The power gradation of the first surface increases from one edge of the useable area to substantially the opposite edge, and may increase according to linear or non-linear relationships. In another preferred embodiment, the two lens surfaces cooperate to create two stabilized areas of optical power, for a prescription with near-viewing and distance-viewing values.

20 Claims, 19 Drawing Sheets

U.S. PATENT DOCUMENTS

| | | |
|---|---|---|
| 6,139,148 A | 10/2000 | Menezes |
| 6,149,271 A | 11/2000 | Menezes et al. |
| 6,305,800 B1 | 10/2001 | Miller et al. |
| 6,364,481 B1 | 4/2002 | O'Connor et al. |
| 6,454,408 B1 | 9/2002 | Morris et al. |
| 6,698,884 B2 * | 3/2004 | Perrott et al. ............ 351/169 |
| 6,789,896 B2 | 9/2004 | Morris et al. |
| 6,874,887 B2 | 4/2005 | Tyson |
| 6,935,744 B2 | 8/2005 | Kitani et al. |
| 6,956,682 B2 | 10/2005 | Wooley et al. |
| 7,159,983 B2 | 1/2007 | Menezes et al. |
| 7,399,080 B2 | 7/2008 | Kitani et al. |
| 7,427,134 B2 * | 9/2008 | Bourdoncle et al. ........ 351/169 |

FOREIGN PATENT DOCUMENTS

| | | |
|---|---|---|
| EP | 1 691 232 | 8/2006 |
| WO | 99/63392 | 12/1999 |
| WO | 0072051 | 11/2000 |

OTHER PUBLICATIONS

James C. Wyant and Katherine Creath, Basic Wavefront Aberration Theory for Optical Metrology, Applied Optics and Optical Engineering, 1992, pp. 28-39. vol. XI, Academic Press, New York. NY, USA.

* cited by examiner

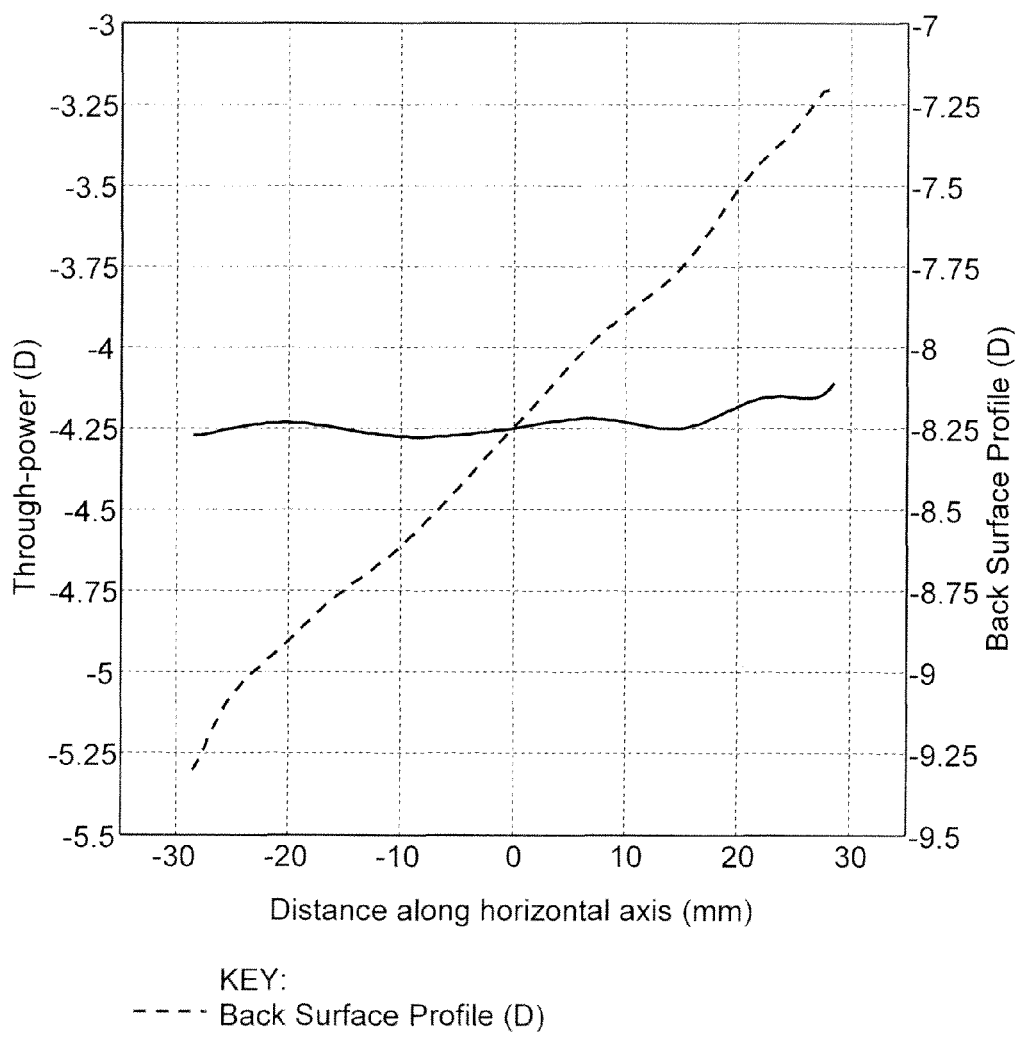

LENS WITH CONTINUOUS POWER GRADATION

BACKGROUND OF THE INVENTION

Ophthalmic lenses to correct human vision have been in use for centuries. Nonetheless, new developments in materials and in optical designs continue to offer more options and various improvements to lens wearers.

As one example, consider the history of developments to address age-related, reduced focal accommodation—the common phenomenon of "needing reading glasses" as one gets older. The eye's lens is held within a sophisticated framework of muscles and fibers, and is pliable enough to be reshaped by the contraction and relaxation of the muscles and fibers. Thus, the action of the muscles and fibers change the shape and therefore the focal length of the eye's lens. The "rest state" is for distant vision, with the muscles relaxed and the lens in a less curved configuration for a longer focal length. For near vision, the muscles tighten and the lens becomes more rounded to bring into focus near objects. When one looks between a distant scene and a near object, the eye automatically tries to adjust muscles in the eye to refocus the eye's lens. However, as one ages, the lens begins to harden, and does not respond as readily to the muscular changes. This reduced accommodation, formally known as presbyopia, prompts the need for some vision correction to assist the eyes.

A simple approach for those with no previous vision correction is to use single vision glasses that provide more power for near-viewing tasks. However, if one then looks through the lenses toward a distant object, the view will be blurred because the lenses are causing one's natural vision to become myopic. A similar effect is seen when looking through a magnifying glass at distant objects. At that point, one quickly removes the glasses which can lead to the problem of misplacing them. As an alternative, one thinks of Benjamin Franklin and his bifocal lenses. Such lenses have a primary surface curvature for distance correction (if necessary) plus an added segment that provides more power for near-viewing tasks. To achieve the higher power, the added segment has a steeper lens curvature, and therefore this segment protrudes from the primary lens surface. Many people object to bifocal lenses because of this visible line and ledge on the spectacles.

Initial efforts to blend the region between the distance and near viewing zones (blended bifocals) raised greater awareness of a wearer's ability or inability to tolerate off-power areas on the lens. Many eyeglass wearers' can tolerate low power errors (typically less than about 0.5 diopters), but others may be extremely sensitive to power variation. This can be particularly problematic for individuals that had "perfect vision" and now, for the first time, need vision correction for near viewing. Any change from perfection seems extreme, even if the actual power variation measurement is very small. Similarly, work on blended designs revealed wearer's sensitivity to the physical locations of off-power regions on the lens, and to the physical size of the off-power regions. In the blended design, there is a narrow area, typically only a few mm wide, between any distance correction and the higher-powered, near viewing zone of the lens. Yet in this narrow area, the power must change at least as much as the difference between the distance and near viewing powers. Since the increased optical power or "add power" for the near-viewing zone is typically in the range of >0.5 diopters to about 4 diopters, this means that most people will note blurriness as the eye crosses over the blended region. This can be quite annoying to users, even if the blended area is not visible to others looking at the lens wearer. This led to further developments designed to minimize the area of such off-power regions, make the power changes more gradual so they could be tolerated, or push them toward locations on the lens that are less often used (such as the periphery).

For example, patents such as U.S. Pat. Nos. 2,109,474 and 2,475,275 have described lenses with one surface having gradually increasing power (changing radius of curvature) to give the user a range of focal lengths across this lens. These lenses may include spherical regions of constant power on the surface with the gradual power increase, like the bifocals and blended bifocals mentioned above. The other side of the lens is described as being ground to prescription, which typically means the distance-viewing correction, and at the time these patents were granted, the grinding expertise would be effectively limited to spherical and cylindrical shaping of the other surface. This means much of the lens could suffer from the same limitations as the blended bifocals, namely blurred vision due to the continuous increase of power.

The limitations and difficulties encountered with these previous techniques re-directed developments of lens design over the last several decades to other approaches. As evidenced by patents such as U.S. Pat. Nos. 3,711,191, 4,253,747, 4,472,036, and 6,019,470, one could make a lens that includes one area of stabilized power for distance viewing, another area of stabilized power for near viewing, and a typically narrow region between these two zones where the power is continually and gradually changing from one of these values toward the other. Lenses with these three regions are commonly referred to as progressive lenses.

It is common in a progressive design is to have a distance viewing area near the top of an eyeglass lens. As an example, assume that the wearer needs a moderate correction for far-sightedness of 2 diopters. Then in the distance viewing area, the corrective power of the wearer's lens will be 2 diopters. Now, for example, assume that the wearer is an emerging presbyope, and needs a slight reading power assistance of 1 diopter, sometimes referred to as an add power of 1 diopter. Therefore, in the second, near viewing area of the lens, the stabilized power will be 3 diopters (2 diopters for overall vision correction, plus 1 diopter for near-vision additional correction). The near viewing area is typically positioned near the bottom of the lens, and often slightly toward the nose; this is consistent with a wearer looking downward toward a book or hand work, and the slightly inward positioning accommodates the binocular tracking of the eyes for a near vision area. Typically, one tries to design the distance-viewing area and near-viewing area to be as large as possible, so the user has "plateaus" of nearly constant, stabilized power for their distance and near eyesight corrections. In particular, the distance viewing area should be large because of the width of viewing angle one may use. The near-viewing area may be smaller, but still must accommodate at least the width of the pupil for clearest reading vision, and preferably subtends a small angle for some eye rotation while reading; thus it is common to make the near-viewing area of stabilized add power at least a few millimeters wide. Between these upper and lower areas, the optical power must change rapidly to the higher, near-viewing value. In this example, that is a change from 2 diopters to 3 diopters. This progressive region or corridor will be characterized by an inflection point and is typically kept relatively narrow and short, because it is neither the desired distance nor near power, and because of physical necessity, as will be explained below.

There is a further complication to achieving such a progressive power increase. The physical surfaces of the lens must be reshaped and more sharply curved in order to create a higher-powered region. In the process of reshaping part of a surface to higher power, other areas with off-power values (and optical astigmatism) will be created. A rough analogy can be made to moving sand in a sandbox, without the option of removing or adding sand to the box. Therefore, in order to make a hill (analogous to an area of higher power), sand must be piled up in one area, but scooped out in other areas. If one wants to keep more of the sandbox at the original level (analogous to an original distance-viewing power), then one must widen the area scooped out to lessen the amount of difference in its height from the rest of the sandbox. However, this means that a larger area has SOME variation from the prescribed distance power, and as indicated previously, some individuals may be quite sensitive to such power variations. Alternatively, one can scoop deeply in a smaller area, but that will obviously create a zone of more extreme off power (greater difference from the original sandbox level). These problems become more severe as the difference between the two optical powers increases (a higher "hill"). These are practical, mechanical and physical limitations associated with lens designs that incorporate changes in optical power.

As an alternative, U.S. Pat. No. 4,950,057 describes the combination of stepped Fresnel optics with refractive lens surfaces to create different optical power regions. This is a distinctly different approach than using only the refractive capabilities of lens materials, and can encounter limitations due to the Fresnel discontinuous multi-step patterns. For example, there can be increased light scattering off the Fresnel steps, which can be annoying for the wearer and unaesthetic in appearance. There may also be distortion or lack of optical clarity in crossing over the multiple stepped structures.

As described in some of the previously mentioned patents and as known to those of ordinary skill in the art, progressive designs can be incorporated on either the outer lens surface (the surface farthest away from the wearer, or the "front" of the lens) or the inner surface (nearest the eye, or the "back" surface) of an eyeglass lens. This is often accomplished via "progressive semi-finished lens blanks" that incorporate on one surface a relatively large, effective stabilized distance-viewing area, another near-viewing area with a known, stabilized power that is greater than the distance power, and a relatively narrow, short corridor running between these two zones (the intermediate section) that is characterized by a progressive increase in optical power and an inflection point. The individual's wearer prescription is then "finished" by cutting and smoothing the other, opposite surface of the semi-finished blank to the specific optical power requirements of the user. With progressive semi-finished lens blanks, this typically means finishing the other lens surface for the distance-viewing correction and using the progressive surface to supply all the near-viewing correction.

Alternatively, both surfaces may incorporate progressive designs, as described, for example, in U.S. Pat. Nos. 4,946,270, 6,935,744 and 7,399,080. Another alternative but related approach is described in patents such as U.S. Pat. Nos. 6,139,148 and 7,159,983, in which one surface is a progressive design and the other surface is a "regressive" surface, that is, a surface where power decreases between the distance-viewing area and the near-viewing area. These regressive surfaces may be placed on either the inner or the outer surface of the lens.

Placing the add power on the inner surface of the lens, or sharing the prescription power between both surfaces allows more freedom in optical design and may have advantages for cosmetic appearances. These options have been further assisted in the marketplace by the growth of digital surfacing equipment, based on CNC machinery, which has the potential for more complicated and controlled shaping of one or both optical surfaces.

Given the continued need for age-related vision corrections, and the fashion-consciousness of many people, it is not surprising that optical performance, physical comfort and cosmetic appearance are all quite important. These factors have played an important role in the re-emergence of inner surface progressives, which may appear less obvious or bulky to someone looking at the person wearing the lens, because the add portion does not bulge forward from the outer surface. Nonetheless, such lenses can be problematic for the wearer, because of the need to accommodate the increased add power toward the eye of the wearer. This means the back surface of the lens will be less curved (less concave) than for single vision prescription, or than for a lens having progressive power on the front (outer) surface. For a high plus prescription, the back or inner surface of even a single vision lens is much flatter than for a high minus powered lens. If one then adds the near-vision power to the inside bottom section of a plus lens (as in a standard back-side progressive design), the inner surface of the lens becomes even flatter, and may contact the cheeks or eyelashes of the user. One way to avoid or minimize this problem is to use a lens with a steeper front curvature, so there is more space to create the add power on the inner surface of the lens. However, the steeper curve will require more lens material to create the same add power as a combination of flatter curves, and the result can be an overall heavier or thicker lens. In addition, using a more curved lens negates the advantage that was being sought: to reduce the bulbous appearance of the front-side progressive.

The same difficulties apply with high minus prescriptions and an add power on the inner surface. High minus lenses have thicker edges, because the inner lens surface's radius of curve is typically steeper than that of the outer surface, to create the correct lensing effect. If a lens with a steeper base curve is used for the front (outer) surface to accommodate a back-side progressive design, the lenses will be driven to even greater and undesired thicknesses, and will appear more bulbous than a normal minus prescription.

Difficulties and non-optimal tradeoffs may also arise when fitting back-surface progressive lenses into the frame. If a steeper base curve was used to accommodate the back-side add power, then one may wish to position the edge of the lens farther back in the frame so it is not so protuberant. However, this may cause contact of the inner surface or the edges of the inner surface with the wearer's face. In addition, depending on the frame shape or the wrap angle, it may be difficult to fit the lens securely or aesthetically. If thicker edges resulted from the back-side progressive design, it may be harder to make the glasses look appealing and balanced. Thus, there are several different concerns that may need to be addressed when employing a back-surface progressive design.

Sharing the power between the two surfaces can obviously offer more options for distributions of thickness and power profiles, but significantly increases the complexity of design, and thus may require higher costs, time and resources to prepare the final lens. In addition, depending on how the different portions of the prescription power are distributed, one may still have problems such as increased thickness on the inner surface (leading to contact with the face or eyelashes of the wearer), excess curvature on the front surface, and increased weight of the lenses.

It is apparent that extensive innovation continues in this field and new options often finds practical industrial applications quickly. The present invention provides a different option for ophthalmic lenses and their design, which is particularly suitable for lenses requiring different powers in different areas of the lens. This is accomplished by creating an innovative surface that is then combined with surfacing of the second surface to meet the optical requirements of an individual's prescription. The combination lens may also take into account other factors of cosmetic or practical design. This invention can advantageously use digital lens surfacing capabilities that have now reached a level of maturity such that they are accessible and practical for much of the lens industry.

SUMMARY OF THE INVENTION

The present invention resides in an ophthalmic lens comprising a first lens surface having a continuous, gradual change in optical power across substantially its entire optically useable surface from one edge to substantially the opposite edge, the change in optical power increasing across the surface without inflection points or discontinuities, and an opposite surface of the lens configured to cooperate with the first surface to provide the desired prescription for the final lens, including at least one area of stabilized power of sufficient size to be effective for clear viewing.

In a preferred embodiment, the gradual power increase on the first surface proceeds from the top of the lens to the bottom of the lens. In another preferred embodiment, the gradual power increase proceeds laterally across the lens.

The shape and nature of the continuous power gradation of the first surface may take various preferred forms. The power may increase in a linear or non-linear fashion, and if non-linear, may follow the form of exponential, logarithmic, logarithmic spiral, parabolic and positive power equations. These continuous power gradations may or may not follow an umbilical line. The gradual power increase can constitutes an increase in spherical power, or in both spherical and cylindrical power.

In alternative embodiments of the invention, the power gradation surface may be the outer surface of the lens, farthest from the wearer, or the inner surface, closest to the face of the lens wearer.

In a preferred embodiment, the continuous power gradation surface and the opposite lens surface may cooperate to provide a single vision correction for the desired prescription.

In another preferred embodiment of the invention, the two lens surfaces cooperate to provide an area for distance-viewing and an area for near-viewing he desired prescription. In a further preferred embodiment, these two areas have different optical powers.

In another preferred embodiment, an ophthalmic lens is produced for a prescription having distance-viewing and near-viewing values. This lens comprises a first surface having a continuous, gradual change in optical power across substantially its entire optically useable surface from one edge to substantially the opposite edge, the change in optical power increasing across the surface without inflection points or discontinuities, and an opposite surface of the lens configured to cooperate with the first surface to provide at least two stabilized areas of optical power for the desired prescription, one for distance-viewing and one for near-viewing. In a preferred embodiment, these two areas of stabilized optical power comprise two different optical powers. The continuous, gradual change in power of the first surface used in these preferred embodiments may comprise linear or non-linear increases in power, and may further contain an umbilical line.

In a preferred embodiment, the cooperation of the first and second surfaces further includes optimization for user preferences.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIG. 19 shows (dotted line and right-hand y-axis values) the surface power profile for the surface of FIG. 17, and the through-power profile (solid line and left-hand y-axis values) for the final lens shown in FIG. 18 as calculated along the horizontal axis at y=0 from the nasal edge of the lens (30 mm) to the temporal edge of the lens (−30 mm).

DETAILED DESCRIPTION OF THE PREFERRED EMBODIMENTS

Figure 1:
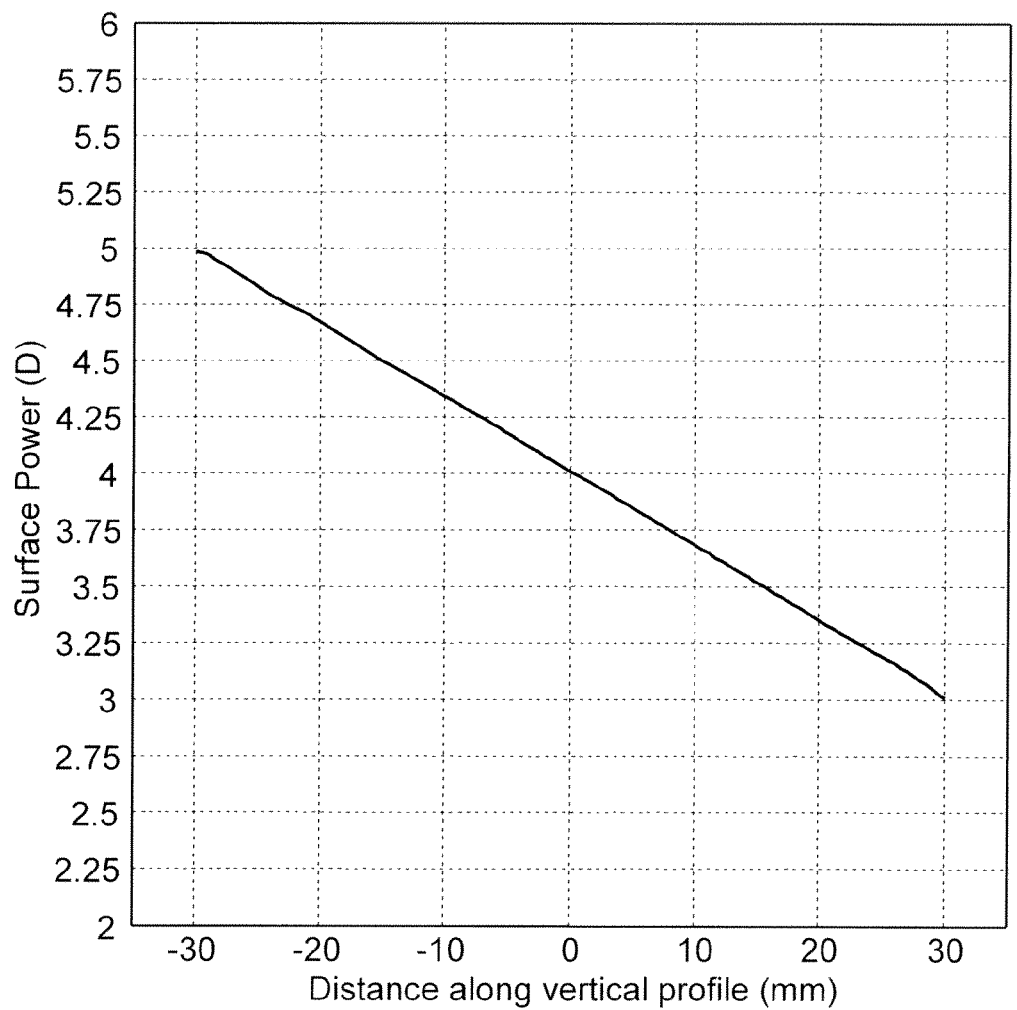
FIG. 1 shows a plot of a continuous power gradation of an exemplary lens surface according to the invention, that increases from a surface power of 3 diopters at the top of the lens (+30 mm) to 5 diopters at to the bottom of the lens (−30 mm)

The present invention is embodied in ophthalmic lenses having one surface that is described by a continuous, gradual increase in optical power, and its combination with the opposite surface of the lens to create one or more effective areas of stabilized optical power. The use of a surface with continuous, gradual power increase is in contrast to normal progressive lens surfaces, which typically embody at least one lens surface having an effective area of approximately constant or stabilized optical power for distance-viewing, another effective area of the same lens surface with a different, approximately constant or stabilized optical power for near-distance viewing, and a narrow, intermediate region between these two defined optical power areas where the power "progresses" from one to the other value. In this manner, the stabilized power "plateaus" are joined by a transitional zone characterized by the rapid power increase and an inflection point. The present invention instead provides a continuous power gradation that proceeds without inflection points or discontinuities and extends over substantially the entire useable optical surface of the lens, rather than being constrained into a narrow corridor on the lens surface. This gradual power increase over substantially the entire lens surface is possible precisely because the invention's power gradation surface does not contain large areas of approximately constant or stabilized optical power.

As a simple estimate, an effective area of stabilized power is defined as a stabilized optical power area of at least 28.27 sq. mm, with no dimension defining the area being less than about 6 mm wide. This size and extent of area corresponds to a 6 mm circle, which would contain a typical area of gaze on the lens surface plus a minimal allowance for eye movement. Remember that the pupil size ranges from about 3-4 mm diameter to about 5-9 mm diameter maximum, depending on lighting conditions and age.

For clarity and convenience, stabilized optical power can be described as an area in which the optical power does not vary by more than ±0.12 diopters from its average value. If a single surface is being described, a stabilized optical power area would be an area on that specific surface with less than ±0.12 diopters variation from the average value of that area. More preferably, the stabilized optical power area has at most ±0.06 diopters of variation from the average value for that area. Stabilized areas have the appearance of plateaus of power, typically with much more limited change in power than adjacent regions.

The invention creates an ophthalmic lens, where one side of the lens is the surface with the continuous gradual power increase, and the other, opposite surface of the lens cooperates with the first surface's gradual power increases to provide in the final lens at least one effective area of stabilized optical power for the desired prescription. It is uniquely the combination of the two surfaces that create the stabilized power area, not just one surface providing an effective stabilized area, nor the combination of two stabilized areas (as in double-sided progressives) overlapping to give a final effective stabilized result. The second surface must be created to cooperate with the gradual increase of the first surface and to add or subtract optical power across the lens to achieve the effective stabilized result for the prescription. The combination of changing power on both sides of the lens can create new areas of selected optical power at specific positions or over defined areas on the lens. This provided significant additional freedom in optical design.

In a preferred embodiment, the second surface of the lens cooperates with the continuous, gradual power increase of the first surface to create at least two effective stabilized optical power areas. More preferably, the two areas comprise one area of stabilized optical power for distance-viewing, and another area of stabilized power for near-viewing. The stabilized areas may have the same optical power, but more preferably, may have two different optical powers, as required by the given prescription for near- and distance-viewing correction.

The preferred embodiments will now be described with respect to the drawings.

FIG. 1 shows an exemplary continuous gradation of the surface power on one side of a lens of the present invention. The surface power is defined as the optical power that can arise due to the given surface's curvature and curvature change, assuming no optical power contribution from the other side of the lens. The continuous power gradation surface may be either the outer or the inner surface of the lens. FIG. 1 illustrates a surface according to the invention that would preferably and typically be used on the outer or front surface of the lens. The distance along a vertical profile across this surface is plotted on the x-axis. For convenience, the topmost edge of this exemplary 60 mm diameter lens surface is defined as 30 mm, the 0-180 line across the middle of the lens is 0 and the bottom-most edge is shown as −30 mm. Larger or smaller lens surfaces can be created and plotted in a similar manner. The y-axis shows the power gradation of this exemplary surface from 3 diopters surface power at the top of the lens to 5 diopters surface power at the bottom of the lens, corresponding in this illustration to a linear power increase down the surface of 2 diopters. Obviously, other ranges of power gradation are within the scope of the invention. Preferred ranges include continuous gradations from about 0.5 D increase across the lens surface to about 15 diopters of power increase across the surface. More preferred ranges include continuous power gradations to increase the power by about 0.5 D across the lens surface, to gradations that increase the surface power by about 8 D across the surface. (These ranges assume a 60 mm lens diameter, and would scale accordingly for larger or smaller lenses). Note that contrary to the prior art, the surface shows no plateaus of approximately constant or stabilized power. In addition, the surface power increases without any discontinuities or inflection points.

Figure 2:
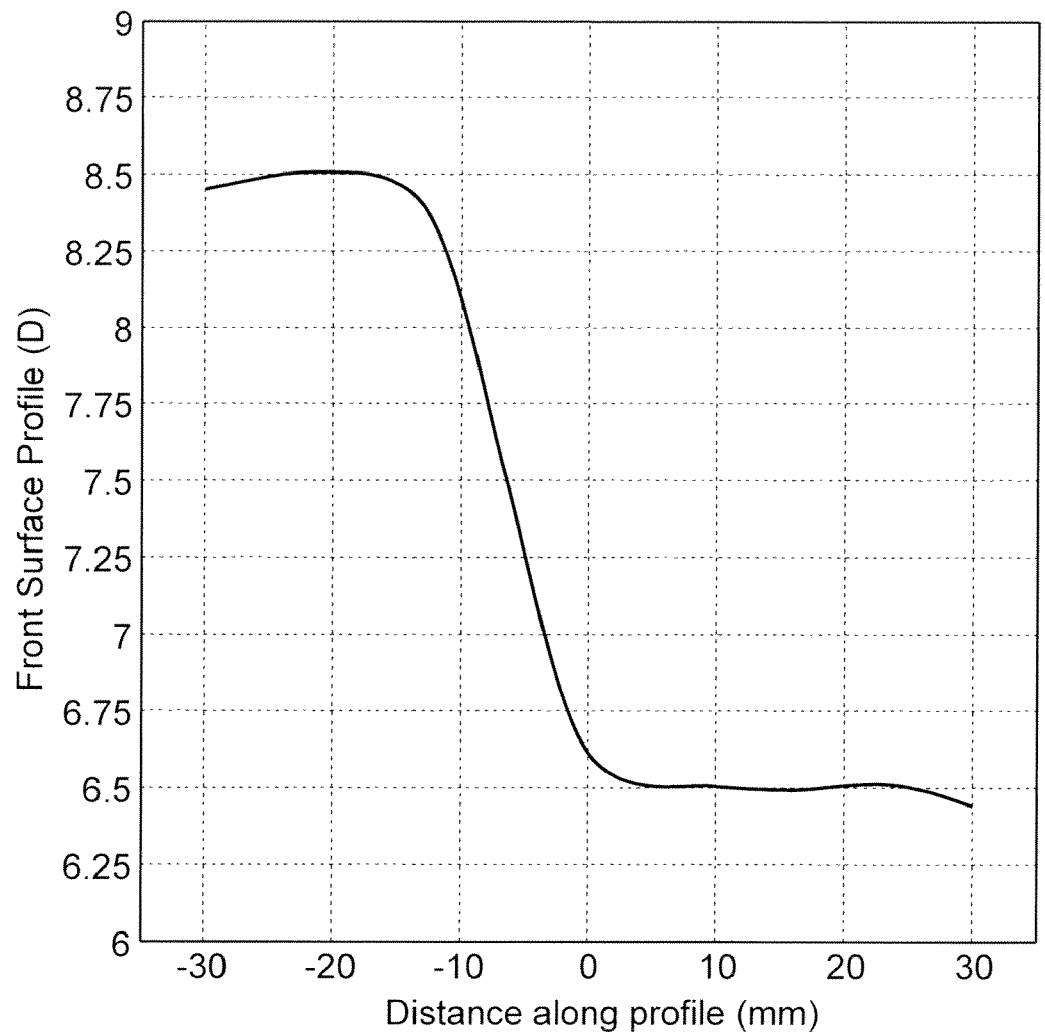
FIG. 2 shows a plot of the surface power on a standard progressive lens surface (prior art) along the line of sight from the top of the lens (+30 mm) to the bottom of the lens (−30 mm).

For comparison, a power profile plot down a typical line of sight for presbyopic viewing on a standard, front-side progressive lens surface (prior art) is shown in FIG. 2. Again, for convenience and easier comparison, the topmost edge of this prior art lens is defined as 30 mm. The line of sight crosses the 0-180 axis of the lens at the distance marked as 0, and reaches the bottom of the lens at −30 mm. The y-axis of this plot shows the optical power progression on this typical progressive lens from about 6.5 D near the top of the lens to approximately 8.5 D near the bottom of the lens surface, giving a nominal 2 D add power. This plot clearly shows a plateau of approximately constant, stabilized lower power (the distance-viewing area) near the top of the lens between about 30 mm and about 5 mm, then a rapid increase in power in the intermediate section over a short distance, and another plateau of approximately constant, but higher stabilized optical power near the bottom of the lens for the near-viewing area starting below about −12 mm and extending to the bottom of the lens. These plateaus are not absolutely flat, but well within the accepted range for variation around an average stabilized value. Such small variations in power are common in the stabilized power areas, due to optical design and practical manufacturing limitations. In addition, there is clearly an inflection point between the plateaus. Comparison with FIG. 1 shows that the prior art is obviously and markedly different from the present invention's power gradation surface.

The power gradation of FIG. 1 can be embodied on lenses with various starting curvatures. For instance, a continuous power gradation increasing by 2 diopters can be realized on a lens surface according to this invention with a nominal spherical curvature of 1 diopters at the top of the lens, and 3 diopters at the bottom of the lens. A continuous power gradation of 2 diopters can also he realized on a lens with a nominal spherical curvature of 6 diopters at the top of the lens, and 8 diopters at the bottom of the lens. The first example may be more suitable for prescriptions with a high minus distance correction, while the second example provides a lens that may be better suited for high plus prescriptions. This illustrates another advantage of the invention's power gradation surface, particularly when it is placed on the outer lens surface: a flatter, more aesthetically pleasing base curve can be chosen for any prescription. The power gradation already provides some of the additional required power on the outer surface, without making that whole surface bulbous.

Figure 3:
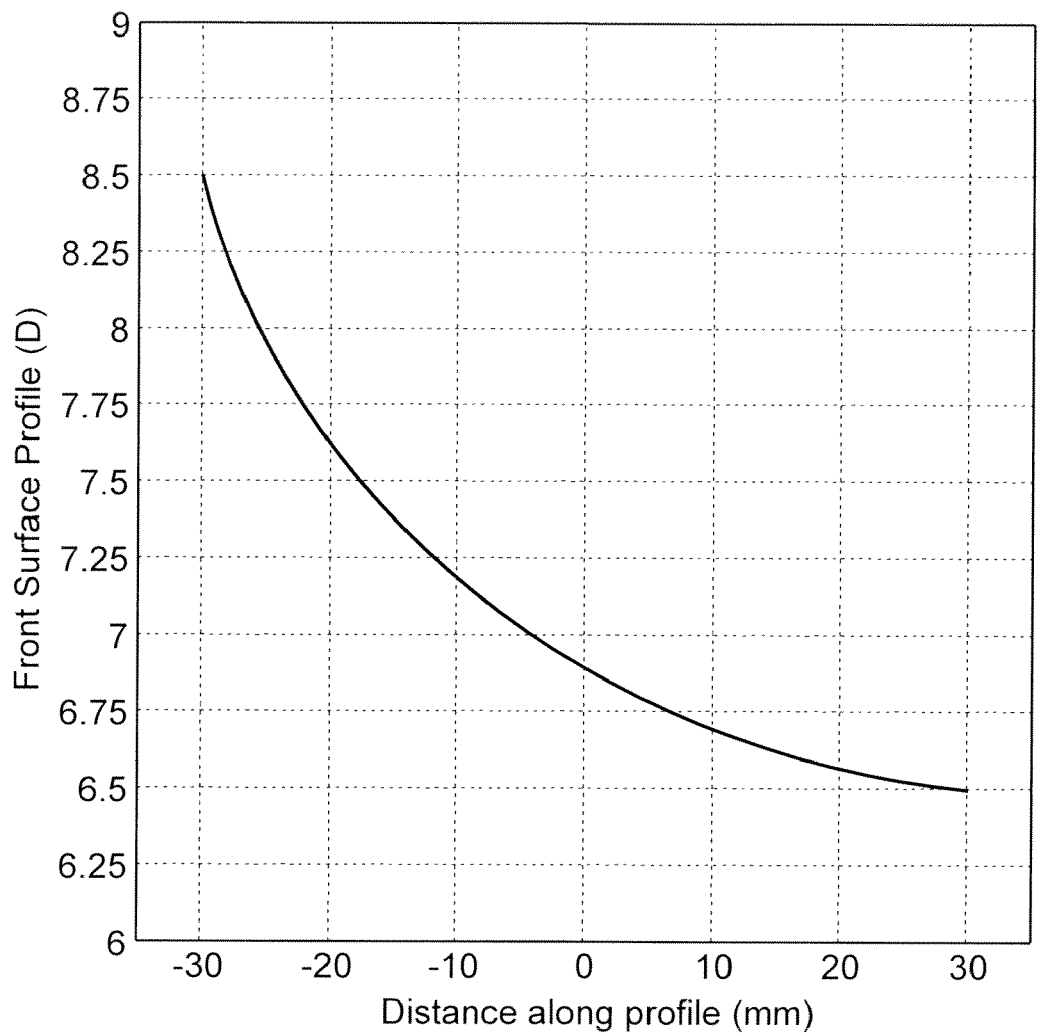
FIG. 3 shows a surface power plot of another exemplary surface according to the invention, with a non-linear increase in power from the top of the lens (+30 mm) to the bottom of the lens (−30 mm).

In FIG. 1, a linear increase in dioptric power is shown. However, it is clearly within the scope of the invention to employ other relationships for the continuous power gradation across the lens surface. For instance, one could use exponential, logarithmic, logarithmic spiral, quadratic, positive power or other non-linearly increasing relationships, to name but a few. An example of a non-linear relationship with a power gradation from the top to the bottom of the lens surface is shown in FIG. 3. This power profile plot clearly shows a more rapid increase in power in the lower portion of the lens (i.e., a faster increase in power with less distance change across the surface) than in the upper portion, but the curve of the surface is smooth and continuous, and not indicative of a plateau as seen in stabilized optical areas. A power gradation surface embodying non-linear relationships that have a more rapid increase in curvature toward the bottom of the lens may be particularly advantageous for presbyopic prescriptions.

It is clear from these diverse, non-limiting illustrations that a wide range of continuous power gradation surfaces can be created according to the present invention. The main characteristic of this surface is a gradual, continual increase in power over substantially the entire optically useable lens surface without discontinuities or inflection points.

In a preferred embodiment, the continuous power gradation surface may be configured as a lenticular surface, with a surrounding margin that is not optically useful. Similarly, it may be configured with a portion of the lens or a partial margin that is not optically useful. Such portions or margins could be included, for example, for thinning the edges of lenses, or as an aid to hold or align the lens during subsequent processing (such as finishing the other lens surface, coating, tinting or otherwise modifying the lens' physical properties). The invention recognizes that the continuous power gradation is an essential element of the optical design of this lens and describes the useable optical area of the lens surface, in whatever manner that surface is configured.

Figure 4:
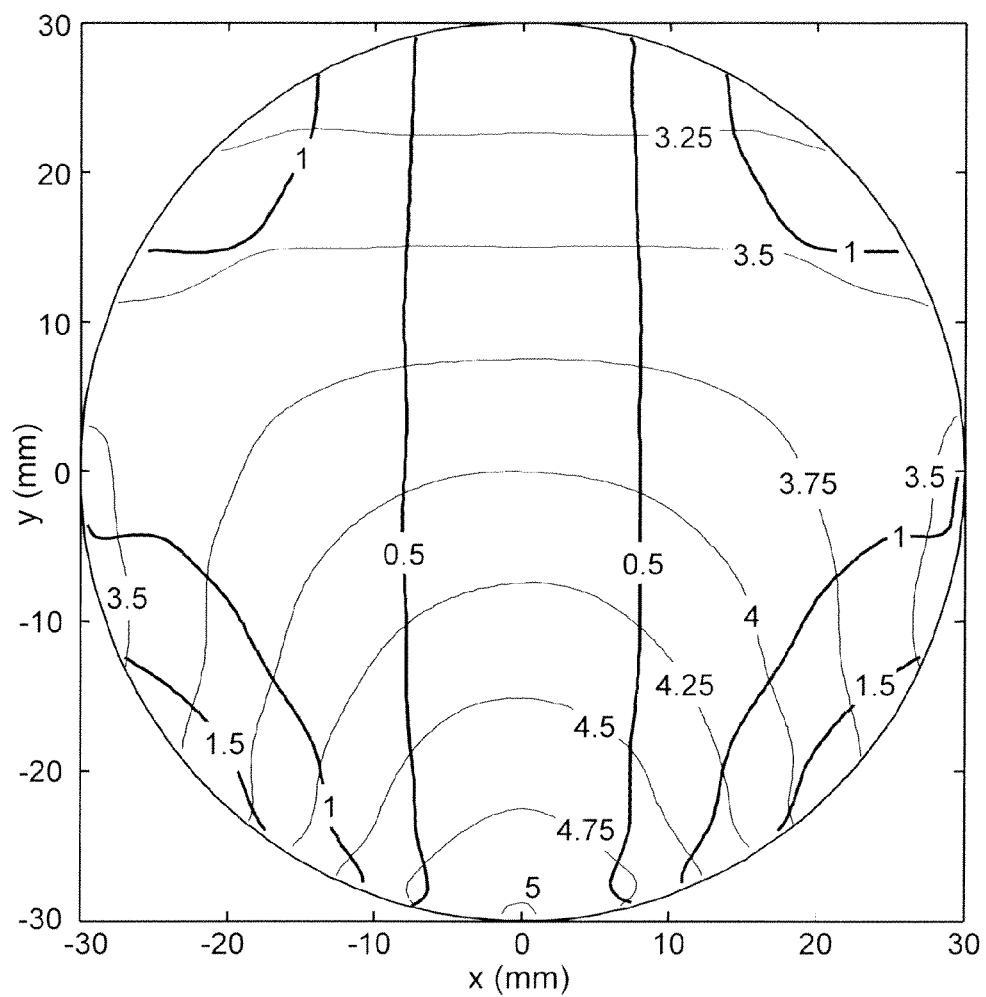
FIG. 4 shows a surface contour plot of the optical power across the exemplary lens surface of FIG. 1, with light line contours showing spherical power gradation in 0.25 D increments, and heavy line contours showing cylinder power gradation in 0.5 D increments.

This may be more easily understood by reference to FIG. 4. FIG. 4 is a two-dimensional view of the exemplary lens surface of FIG. 1, but shown as a surface power map, with contour lines marked at the distances where the power has gradually changed by a given fraction of dioptric power from the previous value. Spherical power changes in 0.25 D increments are shown by light lines, and changes in cylinder power (0.5 D increments) are shown as heavy solid lines. The power change associated with each contour is marked on its line. Spherical power values are expressed relative to a base lens curvature power of 3 D at the top of this exemplary lens surface, increasing to 5 D at the bottom of the lens. Cylinder power is designed in this exemplary surface to be low along a central line of the main power gradation, and to increase only slightly in the x-direction across the lens; therefore, the first contours in the plus and minus x-axis directions are shown at 0.5 D. Since the surface embodies a continual gradation of power as shown in FIG. 1, remember that these lines do not represent stepped changes in power, but merely where the gradual increase has crossed over a stated value.

Note that the power contours extend across large areas of the lens' surface diameter. These contours illustrate abroad, gradual increase in spherical power by 2 diopters over the lens surface, while cylinder power minimally increases toward the sides of the lens. This is an example where the continuous power gradation is primarily a spherical power increase, and is one preferred embodiment of the invention. When, for example, digital processing of the second surface will play an integral role in defining the wearer's prescription, such broad, continuous power gradations on one surface are quite adaptable to a range of prescriptions and can be used effectively to create the final Rx.

One of skill in the art can see from FIGS. 1 and 4 that the continuous power gradation surface of this invention is distinct from prior patents such as U.S. Pat. No. 2,878,721 and from other progressive lens patents and designs, where varying changes in power are constrained to limited, controlled areas of the lens, and stabilized power areas (for distance-viewing and near-viewing) are maximized, as illustrated in the prior art example of FIG. 2.

This continual power gradation approach offers significantly greater freedom in customizing a lens for the user. For example, because the near-viewing and distance-viewing areas have not been pre-defined by the invention's lens surface, they may be moved or adjusted in size and location to suit the wearer. This is a significant advantage over standard progressive surface semi-finished lens blanks, where offset of the design on the other surface may significantly decrease the size of the near- or distance-viewing areas. Similarly, since the continuous power gradation of the invention does not constrain certain areas to maintain a stabilized power, there is less unwanted astigmatism caused by designed contortion of the lens surface; the invention's gradual design produces less relative astigmatism in any given region, because the changes between any adjacent increases are more uniformly distributed.

In addition, this continuous power gradation invention offers greater freedom of design in comparison to the use of spherical lens blanks, or point-rotationally or axial-rotationally symmetrical aspheric single vision lens blanks that are often used in combination with back-side progressive surfacing. First, with the continuous power gradation surface and modern techniques of digital surfacing, add power can be shared between the two surfaces to optimize cosmetic appearance. Second, with this technique of sharing the add power between the two surfaces, it may he possible to obtain larger viewing areas, because the continuous power gradation surface extends across substantially the whole lens rather than being limited to a narrow region as on a progressive lens. Third, the fact that the continuous power gradation lens surface actively contributes to the add requirements of the lens offers a design engineering advantage over the spherical or aspheric single vision lens blanks. Exemplary design advantages that may be achieved due to the power contributions of the power gradation surface include improvements such as thinner (and therefore lighter) lenses, better distribution of the lens thickness in front and behind the lens frame, accommodation of a broader prescription range (due to less limitation by base curve constraints), easier custom design to individual preferences such as eye tracking and use characteristics, and optimization of both prescription power positioning across the lens and of the actual lens configuration (its dimensional properties) for frame wrap, frame angle or tilt.

Another advantage of the present invention is that lenses with the same continuous power gradation surface may be used to create a range of add powers, depending on the design requirements and user preferences. This may be beneficial to optical labs or prescription manufacturers, because they will not need as large or diverse an inventory of starting lens blanks. For example, if a lens of the present invention is used having a power increase of 2 diopters across the outer surface of the lens, and a final lens with 3 diopters of add power is desired, one can design the inner surface such that it contributes toward the total 3 diopters, but achieve two advantages with this invention: 1) the outer surface is not as bulbous as a typical front surface 3 add lens, and 2) the inner surface is not as flat as atypical inner surface 3 add lens, providing better clearance to the cheeks. Alternatively, the same lens surface according to the invention could be used to produce a final lens with a 1 diopter add power region. In this case, the lens will be regressive on a portion of the inner surface, which may be advantageous for some face shapes (such as prominent cheekbones) or with a closely wrapped eyeglass frame. In yet another example, if 2 diopters of add power are needed for the final lens, most of this add power is already present on the lens surface with the continuous power gradation. Hence, the other surface only needs to augment the power slightly near the chosen, final add area, and can be used primarily for other factors in the optical corrections, such as stabilizing different power areas, or for cosmetic considerations of the lens.

In addition, it is possible to use different portions of the invention's power gradation surface to accommodate different prescriptions or user preferences. For instance, consider another linear power gradation surface having a base curvature of 2 D at the top of the lens and 6 D at the bottom of the lens, thus giving a total power increase over the surface of 4 diopters, or an increase of 2 D over 30 mm travel. Many small frames have a height dimension in the range of 20-30 mm. Thus, one could move the position of the frame up or down relative to the lens surface such that it spans different base curve portions. This may be helpful to preferentially match the lens curvature to the prescription needs, and maintain as flat or aesthetically balanced a lens as possible.

Alternatively, lens surfaces with different power gradation ranges or different relationships describing the continuous power gradation can be selected for different add power requirements, and used in combination with the other surface of the lens to optimize performance or cosmetics. Such freedoms in design are particularly useful when attempting to keep the final lens as thin as possible. A thinner lens will be both more comfortable to wear (less mass) and more attractive in appearance.

The invention allows a distinct advantage in thickness balance. With the use of the continuous power gradation surface and the second lens surface cooperating with it, less astigmatism is pushed toward the edges than on a standard progressive design. In addition, because the add power will be shared between the two surfaces, neither surface should protrude as markedly as in a one-sided design. Similarly, in the preferred case of an outer surface with continuous power increases toward the bottom of the lens, the increased effective base curve lower on the lens will automatically begin to balance the lens thickness between the inner and outer surfaces.

Another practical advantage occurs for presbyopic prescriptions when the continuous power gradation invention is embodied as a continuous increase in power down substantially the whole area of the lens surface. Due to the continuously increasing curvature down the lens surface, foveal viewing through the lens is mainly obtained perpendicular to the surface, rather than at more oblique angles as would be found, for example, for back-surface progressive designs. This means that equations that are more accurate can he used to calculate and design optimized prescription designs, with less error caused by highly variable oblique viewing. In addition, because of the perpendicular positioning, there is less difference between the measured prescription on standard lensometers and the actual prescription in use. This is an extremely important consideration for the optical dispenser, because they want to ensure that the prescription dispensed is correct for their patient. With many modern back-side progressives the large oblique angles of view can introduce errors approaching 1 diopter into standard lensometer readings, and lens manufacturers must therefore provide dispensers with alternative readings that the manufacturers assure them will correspond to the correct prescription. Obviously, this is sometimes less than comforting to the dispenser, since they have no practical way to confirm the correctness of the finished lenses.

The continuous power gradation surfaces described so far, and illustrated in the preceding Figures, are particularly suitable for use as front (outer) surfaces of lenses where one desires a higher optical power near the bottom of the finished lens. This positions the power gradation surface in the standard configuration for treatment of presbyopia. It will be obvious to those of skill in the art that the continuous power gradation surface could also be configured with a gradual increase in power from the bottom to the top of the lens for situations where that configuration is useful, such as for airline pilots or mechanics who need to read overhead displays.

In another embodiment, the continuous power gradation surface can be positioned on the inner surface of the lens, closest to the user's eye. In this configuration, the power gradation surface preferably has a shorter radius of curvature at the top of the lens that at the bottom of the inner surface, and because it is the inner (negative) surface, this provide more power at the bottom of this lens surface, in the area of standard use with presbyopic prescriptions. However, if one chooses to use a regressive approach to lens design, one may want use an inner power gradation surface with a shorter radius of curvature at the bottom of the lens than at the top.

In yet another embodiment of the invention, the continuous power gradation profile might be used for single vision corrections to improve cosmetic appearance (such as lens edge thickness), increase the zone of clearest vision, or lessen off-axis errors. Most people perform near tasks while looking downward. The improved viewing angle inherent to the power gradation lens design, which causes all viewing angles to more closely approximate a perpendicular intercept with the lens, will maximize the field of view and create a more comfortable visual perception for even single vision wearers. This also allows more accurate modeling of lens performance and therefore better optimization of the final lens. This may be particularly advantageous where oblique angle viewing errors become more pronounced, for example, in higher-powered corrections, or for prescriptions in wrap-style frames.

Various practices to enhance optical performance or lens appearance in wrap-style frames have been discussed in the literature. For instance, U.S. Pat. No. 6,364,481 focuses on varying prismatic power and specifically decreasing the horizontal component of the prism across a lens from an optical zone into a peripheral zone toward the temples. This is designed to increase the clear optical area by including additional optical corrections in an extension zone toward the periphery. U.S. Pat. No. 6,454,408 also describes improvements in lens designs for wrap-style frames, employing "co-varying surfaces" such that both surfaces' curvature changes are nearly equal at corresponding points on each surface. Preferred surfaces are radially symmetric, and the curvature changes preferably vary the power horizontally across the lens. Similar to U.S. Pat. No. 6,364,481 a central viewing zone, called the visual fixation field in U.S. Pat. No. 6,454,408, is optimized and an extension zone toward the temple is described.

Figure 5:
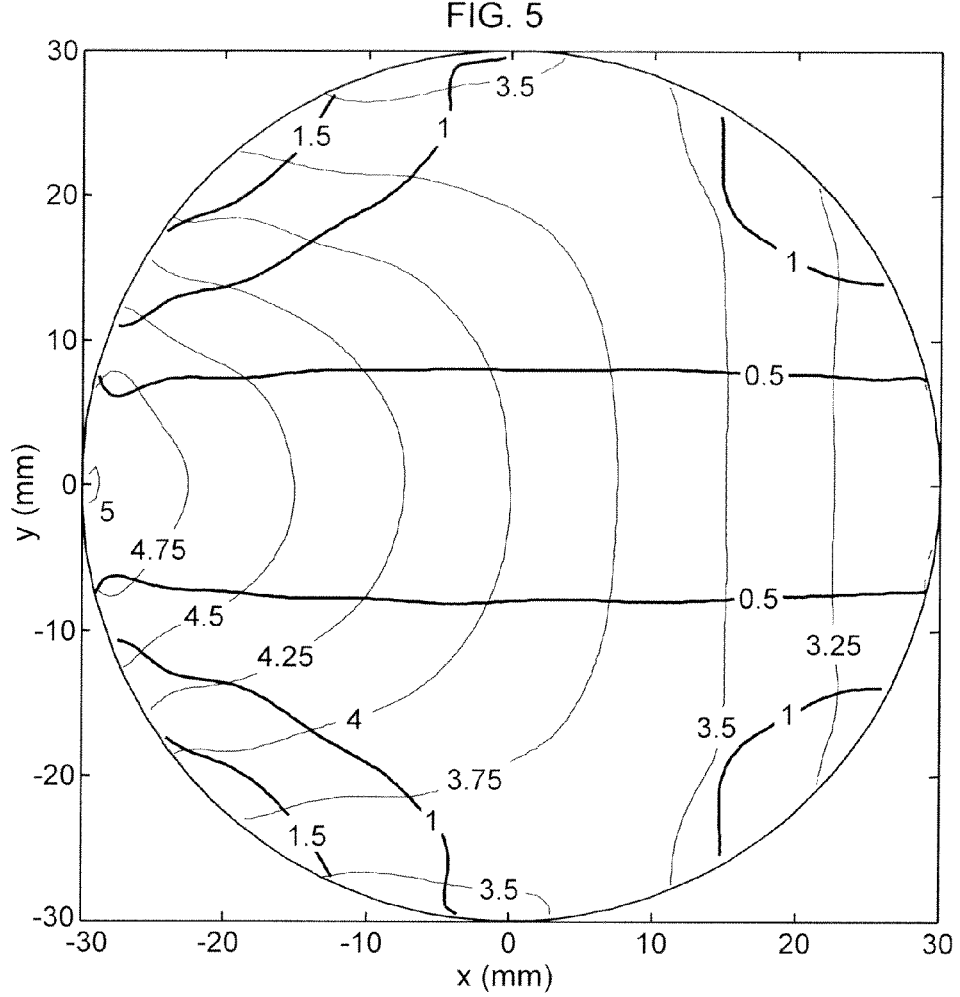
FIG. 5 shows a surface contour plot of the optical power gradation on an exemplary lens surface of the invention, in which the spherical power increases laterally across the lens from 3 diopters at the nasal edge of the lens surface (30 mm) to 5 diopters at the temporal edge of the lens (−30 mm), giving an increase across the surface of 2 diopters of optical power. Light line contours show spherical power gradation in 0.25 D increments, and heavy line contours show cylinder power gradation in 0.5 D increments on the lens surface.

The present invention can be configured in yet another manner that may be useful. In this embodiment, the continuous power gradation increases across the width of the lens, rather than from the top to the bottom of the lens. This orientation is illustrated in FIG. 5 as a surface contour plot of a power gradation lens surface that increases by 2 D of optical power from the nasal side (x=30 mm) to the temporal side (x=−30 mm) of the lens surface. With digital surfacing of the other surface adapted for individual prescriptions, the power gradation increase can address additional conditions besides prism. For example, the increased curvature toward the outer edge of the lens might be useful for tightly wrapped frames, especially with higher-powered prescriptions. A problem often encountered with standard single vision semi-finished lens blanks, particularly those suitable for higher minus prescriptions, is that they are too flat to fit into the strongly curved wrap frames. Therefore, having a continuous power gradation lens that increases its curvature (power) with the horizontal curve of the frame could improve this situation. Another advantage is that this surface configuration again provides less oblique angle viewing because the lens curvature "wraps" toward the temporal edge to allow more perpendicular presentation of the lens power to the eye.

While an increase from 3 D to 5 D of base curvature is shown in FIG. 5 as an illustration, other continuous power gradations and other ranges of base curves are within the scope of the invention. The other surface of the lens would then be surfaced to compensate for the power gradation, such that at least one effective stabilized optical power area is created (for example, for single vision prescriptions), or one or more effective stabilized areas for distance-viewing or near-viewing are created for multifocal prescriptions. Due to the uniqueness of the continuous power gradation design, the corresponding changes on the other surface to achieve the given prescription would require changes different from "co-varying surfaces".

In other embodiments, the continuous power gradation increase can comprise an increase in cylinder power instead of, or in addition to, an increase in spherical power. A small gradual increase in cylinder has been seen in the previous examples of the power gradation surfaces in FIGS. 4 and 5. In some instances, this may occur in connection with a planned spherical power gradation, due to constraints of a lens' surface. However, one may also choose to design this surface of the invention primarily for cylindrical power gradations, or for a controlled amount of cylinder increase. This may be particularly advantageous for single vision prescriptions, and again may be useful for wrap style frames, especially those with a pronounced bend near the temporal side. A preferred embodiment of this cylinder power gradation would be a linear increase with a vertical axis.

The surface with the continuous power gradation may or may not be designed with an umbilical line. That is, the invention can be embodied such that, at any given point along a chosen line, the horizontal and vertical curvature are equal, forming a controlled umbilical progression. In the present invention, this umbilical does not join two effective areas of stabilized power (as in many progressive lens surfaces), but instead extends from one edge of the useable optical area of lens to the other, along a line of gradually, continuously increasing power. This embodiment provides decreased unwanted cylinder along the umbilical and to each side of it due to the designedly spherical nature of an umbilical line. However, this will be accompanied by increased unwanted cylinder away from the umbilical.

In one preferred embodiment, a long umbilical line for the power gradation would be positioned according to the user's reading gaze movement, and therefore is likely to angle toward the nose. Alternatively, the umbilical can aim in other directions than a traditional progressive lens. For instance, a power gradation increase along an umbilical could be aligned with the 0-180 axis (horizontal) on the lens. This embodiment may be particularly useful for wrap frames. Power gradations with umbilical lines could be positioned at other angles across the lens surface, to adapt to various frame shapes or individual prescriptions.

Another preferred embodiment uses continuous power gradation surfaces without an umbilical line. In this case, while some discrete points on the surface may have equal curvatures in the horizontal and vertical directions, a continuous line with equal curvature in perpendicular orientations is not defined. Therefore, at any given point, the surface may have different curvatures in the horizontal and vertical directions. In the prior art, cylindrical or toroidal surfaces for single vision lenses are common, and progressive lenses with different powers in the perpendicular axes are known (see, for examples, U.S. Pat. Nos. 6,935,744 and 7,399,080), but these approaches have not incorporated a continuous gradual increase in power over the entire optically useable lens surface. Both the progressive lens designs and the single vision lenses embody large areas of stabilized optical power, in distinction from the present invention.

A continuous power gradation surface without an umbilical line will have lower maximum unwanted cylinder than a similar surface with an umbilical line, because no line is constrained to be purely spherical. This means less correction of unwanted cylinder will be required by the other surface to achieve the same optical performance as a surface with an umbilical, or alternatively, better optimization can be made because smaller corrections are needed. In addition, without a defined line of performance, there is again more freedom in orientation, lateral positioning and optimization between the two surfaces. Thus, the option of no umbilical line is an advantageous embodiment of the power gradation surface.

Embodiments of the power gradation surface are then combined with the other surface of the lens to create the desired prescription and provide the final lens with at least one effective area of stabilized optical power. Preferably, for prescriptions with distance-viewing and near-viewing values, the invention's combination of lens surfaces will provide at least two areas of stabilized optical power. More preferably, one of two areas will be created for distance-viewing and one for near-viewing. More preferably, the two areas of stabilized optical power created will be effective areas.

Optionally, the combination of the two surfaces may take into account other factors, such as cosmetic appearance, individual user's preferences or practices, ease of manufacture, and optimization of optical performance. User preferences include, for example, such factors as physical distance on the lens between the distance-viewing and near-viewing areas, the size of the distance-viewing and near-viewing areas, the amount of cylinder (astigmatism) tolerated in and around the viewing areas, the preferred angle of gaze between the distance and near-viewing area, and other factors based on the activities and habits of the wearer. These and similar factors can be allotted differing degrees of importance in design or optimization routines.

When a prescription is received, a continuous power gradation surface can be selected a priori to complete the lens, or additional information may be gathered on how the lens will be used. Another advantage of the invention is that one has increased freedom to adapt any power gradation surface to a wide variety of prescriptions. For example, consider a linear power gradation increase of 2 diopters down the surface of a lens. There are numerous ways this surface can be used in combination with unique mathematical designs of the other surface to create lenses with +2 diopters of add, lenses with +1 diopters of add (some power subtracted by the other surface), lenses with +3 diopters of add (some additional add power contributed by the other surface), as well as intermediate add powers, while incorporating a range of distance-viewing corrections. Similarly, since the power gradation surface is not constrained by small regions of distance and add power, the other surface can be designed to broaden, offset horizontally or reposition vertically the resultant distance and near-viewing areas of the final prescription.

In a different example, one could change the orientation of the lens so that the power gradation increase runs not down the lens, but across the lens for a wrap style. The other surface would then be adapted to either create an add region, if needed for the prescription, or to combine with the power gradation to provide a single vision correction. As mentioned earlier, with the power gradation across the lens, it may be easier to design the other surface to create larger areas of clear vision even for a wrap style. This optimized visual area is aided by the power gradation increase, which may be selected to better fit the wrap curvature and keep the lens surface more perpendicular to any viewing direction. In another example, if the user's specific angle of gaze for reading is known, the power gradation increase could be aligned with that angle (rather than just positioned vertically) for more complete use of the surface's increasing power. Other applications will be readily apparent to those of skill in the art.

Alternatively, one may chose a different continuous power gradation surface depending on various factors. For example, one may prefer a more rapid power increase or a non-linear increase, such as shown in FIG. 3, for a smaller frame. In another example, if there is enough room between the frame and the face, one may choose a gradation that places more of the add power on the inner surface of the lens, to improve the aesthetics. For high plus or high minus distance prescriptions, one may chose a power gradation on a different starting lens curvature, or with a different total extent of increasing power, in order to thin the lens or to balance the thickness of the lens in front and in back of the frame. A different power gradation increase, a different mathematical relationship describing the power gradation, or a different base curvature for the surface may be chosen depending on frame design and fit factors, such as, among others, the pantoscopic tilt, face form or wrap angle, pupillary distance and corneal vertex distance. A continuous power gradation surface with an umbilical line may be preferred for persons who are extremely sensitive to unwanted cylinder, while a power gradation surface without an umbilical line (and therefore lower overall unwanted cylinder that is more distributed across the surface) may be preferred for an emerging presbyope with a limited add requirement. Manufacturing factors may also be taken into consideration, such as how much extra material needs to be removed from the other surface to create the final prescription, or how difficult it is to create the necessary features of the final lens. For instance, it is unlikely that one would choose a power gradation surface with a power increase of only 0-0.50 diopters if the final near-viewing power needed to be 4 diopters stronger than the distance-viewing correction, since that would force the other surface to supply the preponderance of the add power, and decrease the effective advantages of using the power gradation surface. These are but a few examples and one skilled in the art will recognize other advantageous options to be considered within this invention.

Once the continuous power gradation surface is selected, the other surface is calculated such that its combination with the first surface will yield the desired prescription, and create at least one effective stabilized optical power area for the final lens. The continuous power gradation surface will be expressed by a known equation or equations, or will be described by a unique set of xyz coordinates. The equation(s) or values for the power gradation surface, along with the final prescription and any other factors that will be taken into account, are then entered into calculation routines to define and optimize the other surface, and the combination of the two surfaces. This can he accomplished by many known techniques, including ray tracing, wavefront propagation analysis, curvature calculation, or combinations of these or other techniques. The computations are then used to program or direct the operation of a surfacing instrument, such as a CNC machine, to shape the surfaces to the desired values.

Throughout these discussions, the continuous power gradation surface has been described like a semi-finished blank, in which one surface of the lens blank, either the inner or the outer surface, embodies the power gradation design and is not further altered for optical power. Many state of the art digital surfacing machines most easily accommodate a semi-finished lens blank where the outer surface requires no further work, and the inner surface is cut or "finished" by the machine to final shape and surface quality. While this is a very practical and preferred embodiment, one will recognize that the invention can be accomplished by surfacing both sides of a blank, cutting one surface according to the equation(s) or xyz coordinates of the desired continuous power gradation surface, and cutting the other surface to combine with the power gradation surface to create the final prescription. This approach does require an extra set of cutting steps, but provides the option that no stock of semi-finished power gradation blanks needs to be maintained. All these options are within the scope of this invention.

These additional variations and other configurations are not comprehensive of all possible embodiments, but provide further examples that one skilled in the art would recognize within the scope of various embodiments of the invention.

The invention will now be described in more specific detail with reference to the following non-limiting examples.

Some of these examples describe embodiments of the invention to create prescription corrections for both distance-viewing and near-viewing, with lenses that exhibit an effective add power. In the ophthalmic lens industry, there are multiple ways to define add power regions, including (nominal add power−0.125 D), (nominal add power−0.25 D), at least 75% of the add power, and at least 85% of the add power. In the following examples, where applicable, we will use the conservative but illustrative definition of 90% of the add power (e.g., 0.90*2=1.8 D for a 2 D add power lens).

EXAMPLE 1

The goal was to design a lens according to the present invention with a zero diopters of distance-viewing correction and an add power of +2 diopters. For convenience, this lens was designed with distance correction in the upper portion of the lens, and the add power near the bottom of the lens, similar to the layout of a standard progressive lens. The following standard fitting parameters were used in the calculations: distance from the cornea of the eye to the lens' back surface vertex (corneal vertex distance): 13 mm; displacement of near-viewing region: 2 mm toward the nose; distance to full add value from 0-180 line of lens: 16 mm; pantoscopic tilt: 8 degrees; wrap angle: 5 degrees.

The surface shown in FIGS. 1 and 4 was used as the continuous power gradation surface on the front of the final lens. This surface was modeled mathematically as a sum of 150 orthogonal Zernike polynomials, ordered according to the Wyant-Creath scheme, and the coefficients of this surface representation became the input for the prescribed lens calculations. Calculations were performed via exact ray tracing to combine the information on the power gradation surface and the fitting parameters, and determine the other lens surface's needed characteristics to satisfy the prescription requirements. For these calculations, the other lens surface (in these Examples, the back lens surface) was represented by a separate expansion of 150 Zerenike polynomials. The coefficients of the back lens surface's expansions were found by minimization of a merit function that compares the actual power map at any stage of the computation with a theoretical power map. The optimization was carried out using the BFGS (Broyden-Fletcher-Goldfarb-Shanno) optimization algorithm.

Figure 6:
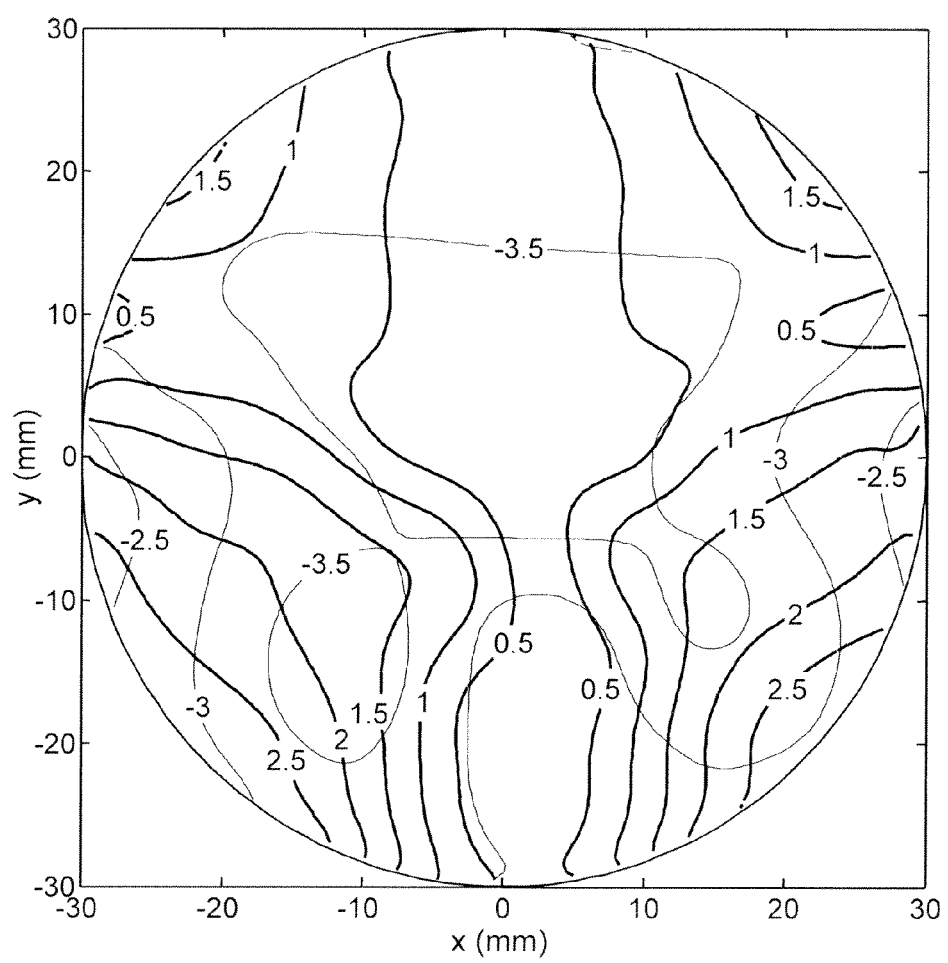
FIG. 6 shows the power contour plot (in 0.5 D increments) for the other surface of the lens that will combine with the surface of FIG. 4 to form a final lens for a prescription requiring zero diopters of distance-viewing correction and a nominal +2 D add power. Light line contours show spherical power changes, and heavy line contours show cylinder power changes.

FIG. 6 show a surface contour map of the back surface that was calculated for combination with the lens surface illustrated in FIG. 4 to meet this prescription requirement. In this Example, FIG. 6 was designed to be the inner surface of the lens. Note that this inner surface shows a significant amount of cylinder and rapid cylinder change across the lower surface (heavy line contours), while the spherical power (light line contours) changes much less.

Figure 7:
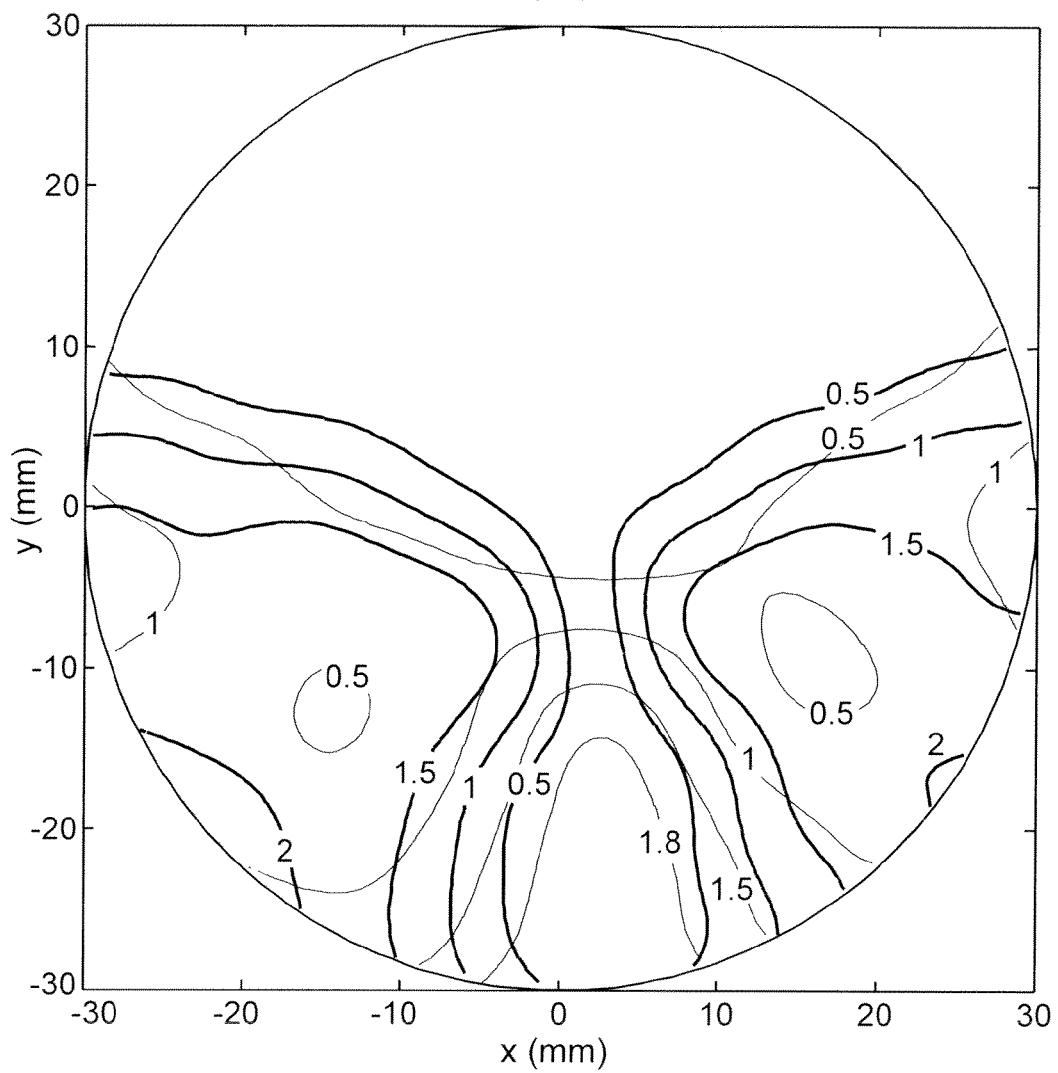
FIG. 7 shows a power contour plot (in diopters) of calculated through-power readings on an exemplary lens of the invention designed by the combination of the power gradation surface of FIG. 4, and the other lens surface of FIG. 6. Light line contours identify spherical power values and heavy line contours identify cylinder power of the lens.

FIG. 7 shows the calculated through-power contour plot that results when the surface of FIG. 6 is combined with the power gradation surface of FIG. 4. This plot shows the effective optical power that will be perceived when looking through the lens. Heavy lines mark cylinder values and light lines indicate spherical power contours. The add region is indicated by the spherical power contour of 1.8 D, corresponding to the region with optical power of at least 90% of the desired add power. FIG. 7 shows that the combination of the two surfaces creates a lens with a large, stabilized optical power area for distance-viewing with zero correction (plano power), an intermediate corridor with rapid change in optical power, and another area of stabilized optical power of about +2 diopters for the add area.

Figure 8:
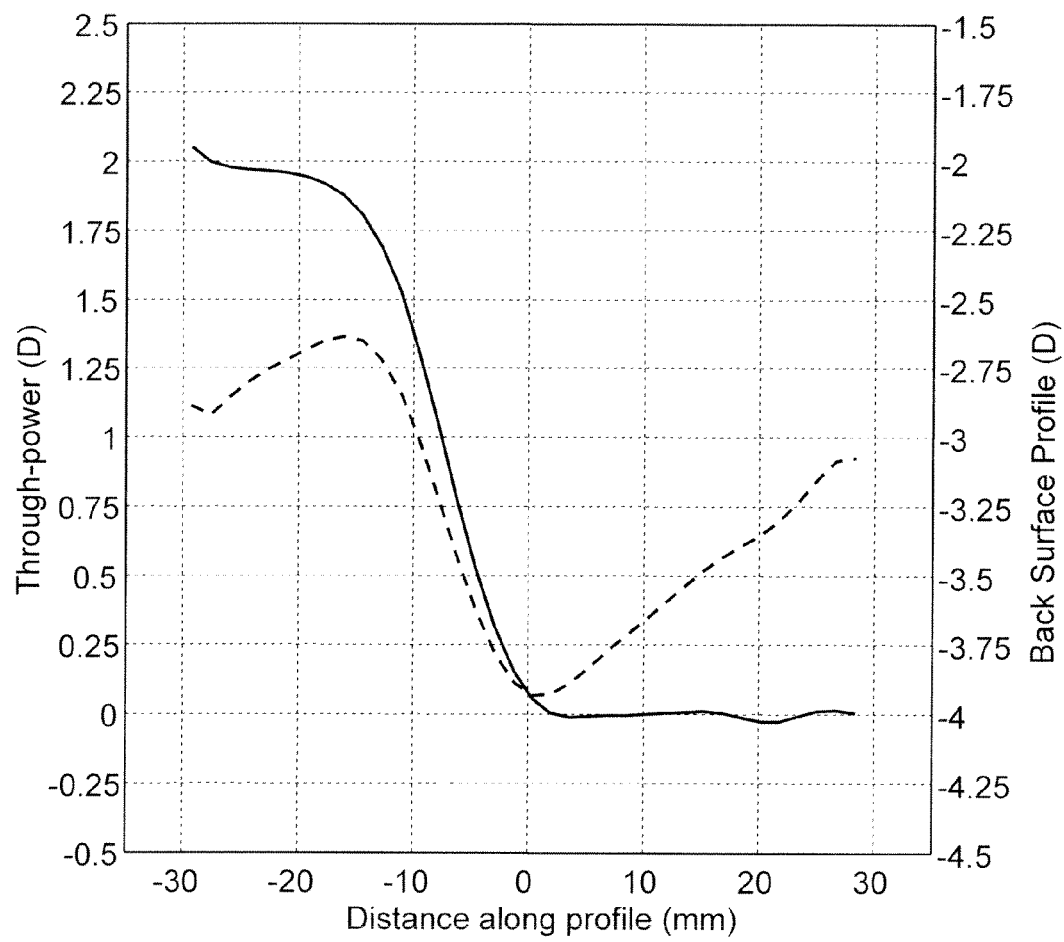
FIG. 8 shows (dashed line and right-hand y-axis values) the surface power profile for the surface of FIG. 6 and the through-power profile (solid line and left-hand y-axis values) for the final lens shown in FIG. 7 along a typical line of sight for presbyopic viewing from the top of the lens (30 mm) to the bottom of the lens (−30 mm).

Analysing this lens in another way, FIG. 8 shows the calculated power along a profile following a typical presbyopic line of sight from the top of the lens to the bottom of the lens and passing through the resultant intermediate corridor and the add area of the lens of this Example. The dashed line traces this positional profile along the back surface of this lens with the associated surface power values shown on the right-hand axis. The solid line traces the same positional profile on the final lens, with the through-power values calculated for this lens shown on the left-hand axis.

The solid line profile of FIG. 8 tracing through-power for the final lens shows that two stabilized areas of optical power have been created for the final lens by the combination of the front lens surface illustrated by FIGS. 1 and 4, and the back lens surface illustrated in FIGS. 6 and 8 (dashed line plot). The solid line through-power shows one area having a value of approximately 0 diopters as required for the distance-viewing prescription extending from about 30 mm to near 0 mm, and another area extending from about −15 mm to −30 mm with a power of nearly 2 D. Both areas appear as plateaus of power. These areas comply with even the most demanding preferred definition of a stabilized area with average power±0.06 D. Re-examining the contour plot of FIG. 7 in these two regions confirms that the areas created with stabilized optical power by these two lens surfaces have sufficient extent across the lens surface to be effective. Thus, the Example has achieved the result of creating effective stabilized area of optical power by the combination of these lens surfaces.

In addition, the dashed line profile of FIG. 8 shows the surprising power variations required of the back surface to cooperate with the power gradation front surface to supply the prescription desired. This is an unusual and non-intuitive form for a lens surface, with multiple changes in power, and such changes occurring in both locally negative and positive directions.

Another uniqueness of the invention is that the desired prescription was accomplished without depending on specific stabilized power areas or plateaus on the power gradation surface, yet this surface contributed significantly to the final add power. This can be seen by comparing the values of surface power between y=−10 and y=−30 on the surface power profile plots as shown in FIG. 1 and the dashed line of FIG. 8. In this region, surface power for the front surface (FIG. 1) increases from approximately 4.3 D to 5 D. In contrast, the surface power for the back surface first decreases from −3 D to approximately −2.65 D between −10 mm and −15 mm, then increases back to approximately −2.9 D by −30 mm. The addition of these two surfaces' powers provides a very crude approximation of the resulting add power of the lens. In this case, that addition would range from about (+4.3+−3)=1.3 D to (+5+−2.9)=2.1 D. This is consistent with the more exactly calculated through-power readings illustrated by the solid line of FIG. 8, which show the add power increasing from about 1.35 D to near 2 D in this region, primarily driven by the increase in the surface power that occurs on the continuous power gradation surface. Again, comparison of the data for the final lens in FIGS. 7 and 8 shows that the plateau regions of FIG. 8 correspond to effective stabilized optical power areas created for the final lens by this combination of two varying lens surfaces.

Two additional examples are provided to illustrate how the invention can be used to tailor the properties of the lens for a given prescription, or for preferences or use by the wearer. Again using the exemplary prescription of zero diopters of distance-viewing correction and +2 diopters add power, EXAMPLES 2 and 3, and FIGS. 9-12 demonstrate how one can use the surface described above and illustrated FIGS. 1 and 4 as an exemplary front surface, and design and combine various other surfaces to create lenses with the same Rx, but with different optical or user-desired characteristics. The method of mathematically expressing the surfaces, and the optimization technique for these EXAMPLES is the same approach as used for EXAMPLE 1.

EXAMPLE 2

In this Example, as in EXAMPLE 1, the goal was to design a lens according to the present invention with zero diopters of distance-viewing correction and an add power of +2 diopters. However, in this instance, the calculation had the additional constraint that the lens should have a shorter vertical distance between the distance and the near viewing areas than the lens in EXAMPLE 1. This constraint may be desired, for example, by a person selecting smaller eyeglass frames, or who exhibits less downward eye movement to accommodate the reading position. The fitting parameters were the same at those used in EXAMPLE 1, except the distance to the full add was set at 13 mm below the 0-180 line instead of 16 mm.

Figure 9:
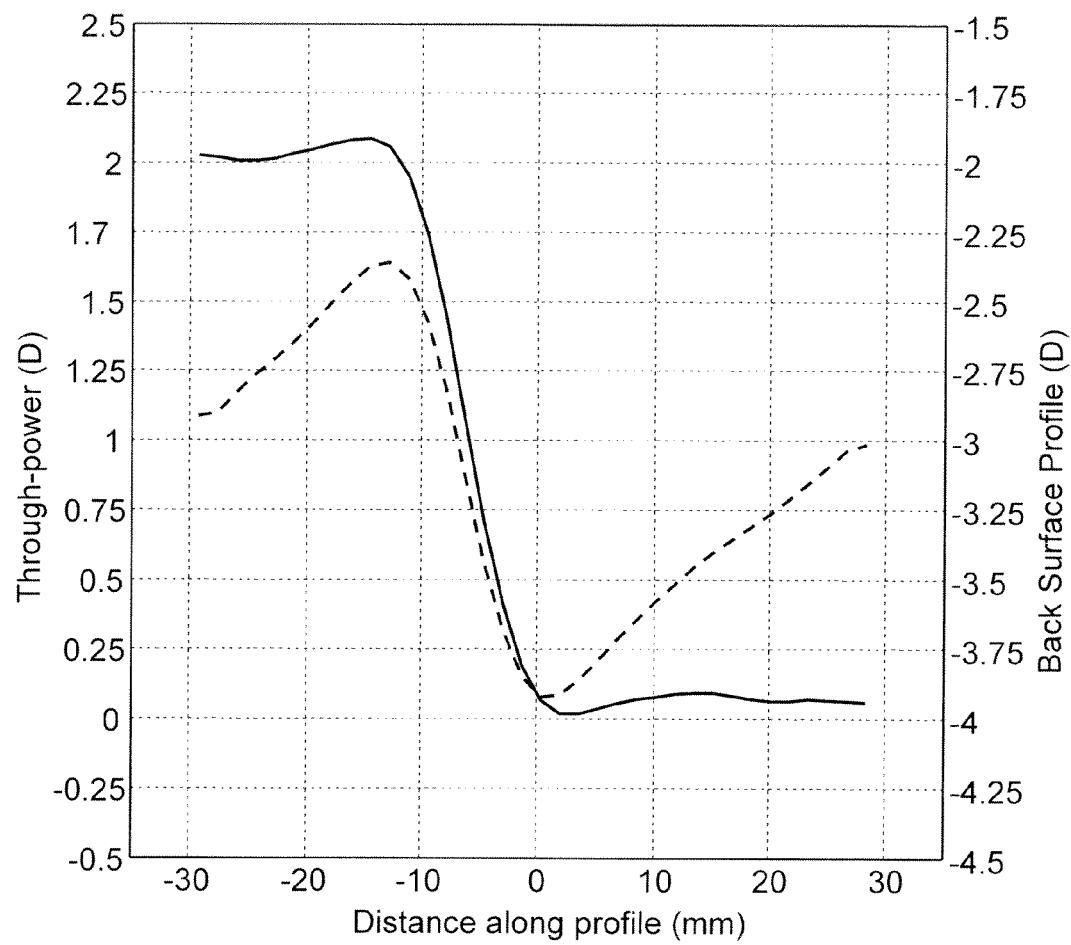
FIG. 9 shows power profile plots calculated for another exemplary lens according to the invention for a prescription requiring zero diopters of distance-viewing correction and a nominal +2 D add, but with a shorter distance between the distance-viewing area and the near-viewing area than for the lens illustrated in FIGS. 7 and 8. The power profiles proceed along a typical line of sight for presbyopic viewing from the top of the lens (30 mm) to the bottom of the lens (−30 mm). The dashed line and right-hand y-axis values plot the surface power profile for the alternative back surface of this lens, and the solid line and left-hand y-axis values show the through-power for this lens. (The surface profile of the front surface of this lens is illustrated in FIG. 4.)

FIG. 9, in a manner similar to FIG. 8, shows calculated power profiles following a typical presbyopic line of sight from the top of the lens to the bottom, and traces the optical power values across the back lens surface (dashed line and right-hand axis) and the calculated through-power values of the final lens of EXAMPLE 2 (solid line and left-hand axis). The through-power of the final lens in this Example (solid line in FIG. 9) shows the two stabilized optical power areas as desired for the prescription. In addition, comparison of the through-power profiles of FIGS. 8 and 9 shows that the stabilized area with approximately +2 D add power has been reached at a shorter distance down the profile of the lens illustrated by FIG. 9. The same power gradation surface (as illustrated in FIGS. 1 and 4) was used in both EXAMPLES 1 and 2. Therefore, in order to move the add region higher on the final lens, the back surface of EXAMPLE 2 must have a different power contribution than the back surface in EXAMPLE 1. This is seen on the profile trace (dashed line) of the back surface in FIG. 9. At −10 mm, the surface power is only −2.5 D (as compared to −3 D in Example 1) and therefore this back surface subtracts less from the power gradation of the front surface in the upper portion of the add area than did the back lens surface illustrated in FIG. 8.

Figure 10:
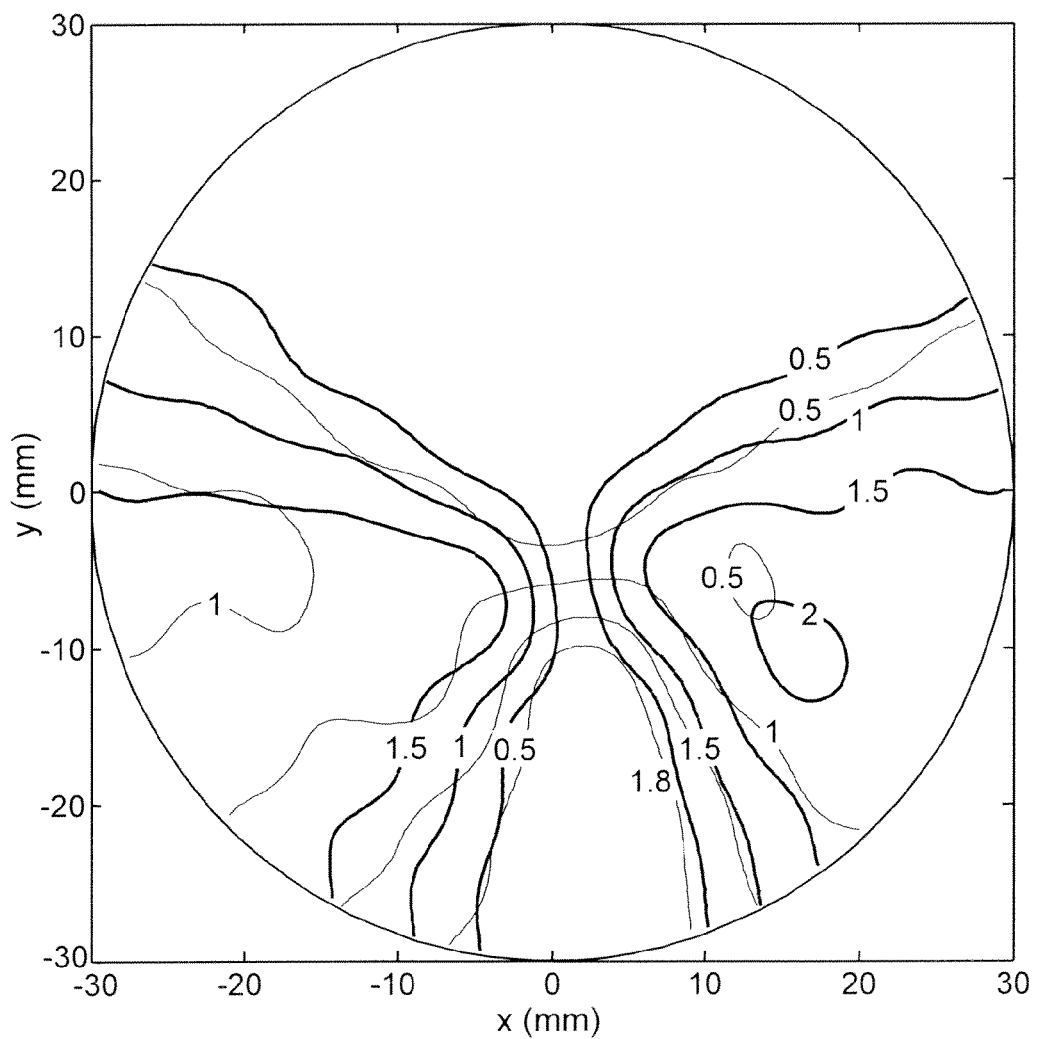
FIG. 10 shows the power contour plot (in diopters) for calculated through-power readings on an exemplary lens that is also illustrated by FIG. 9. Light line contours identify spherical power values and heavy line contours identify cylinder power of the lens.

For additional information, FIG. 10 shows the calculated power contour plot for expected through-power readings of this exemplary lens. The region enclosed by the 1.8 D spherical power contour is definitely extended further toward the middle of the lens, in comparison with the lens of EXAMPLE 1, showing that the shorter distance to an effective stabilized add power area has been achieved by this combination of surfaces. One notes that both the 0.5 D sphere and cylinder contours appear higher in the positive y direction for the through-power reading contour plot of FIG. 10 than seen on FIG. 7; this effect is often seen on progressive lenses with a short distance to the add, too, and can be even more pronounced than in EXAMPLE 2. It is likely that one advantage of using the continuous power gradation surface design is to lessen such intrusions of unwanted power into the distance-viewing area of the final lens. Similarly, note that the effective stabilized near-viewing region defined by the 1.8 D contour in FIG. 10 is even larger than for the design of EXAMPLE 1. This shows another variable that can be influenced by the optimization of the combination of the power gradation surface and the other surface of the lens.

EXAMPLE 3

The goal was to design another lens according to the present invention with zero diopters of distance-viewing correction and an add power of +2 diopters. The fitting parameters were the same at those used in EXAMPLE 1. However, in this instance, the calculation had the separate requirement to create a lens with a wider near-viewing area than EXAMPLE 1.

Figure 11:
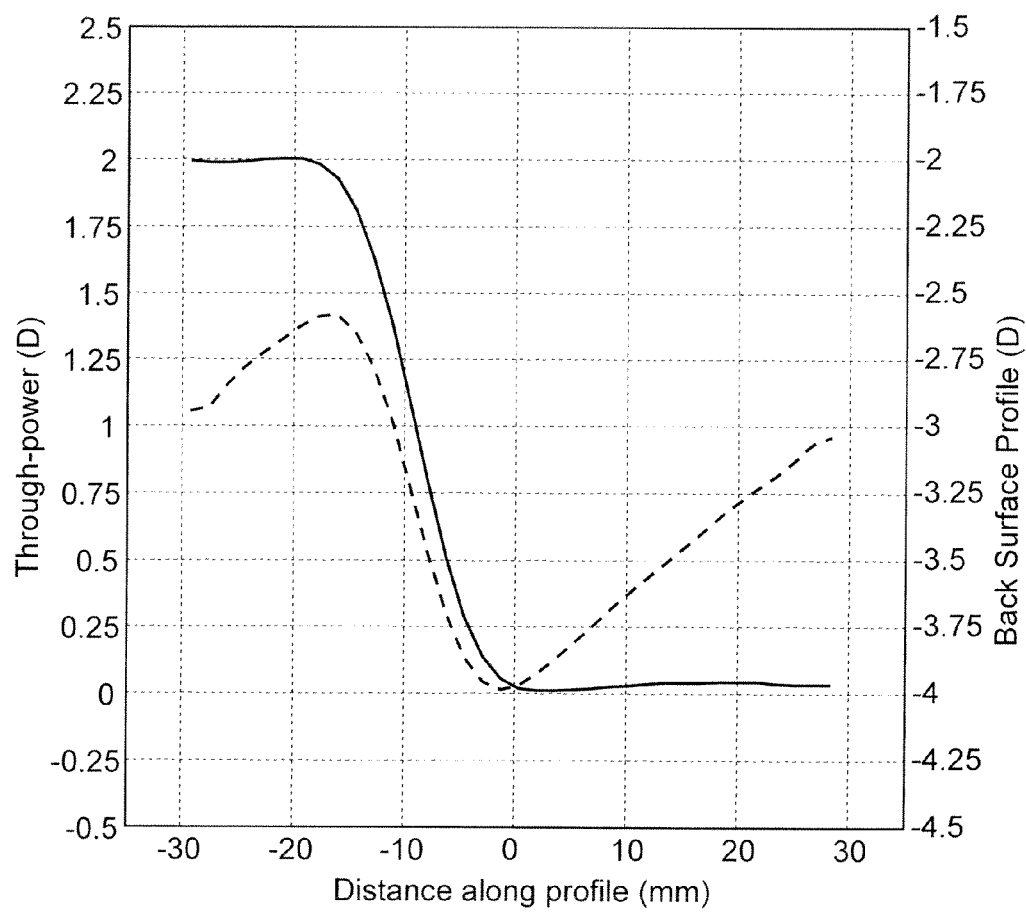
FIG. 11 shows the power profile along a typical line of sight for presbyopic viewing from the top of the lens (30 mm) to the bottom of the lens (−30 mm) for another exemplary lens of the invention designed for a prescription requiring zero diopters of distance-viewing correction and a nominal +2 D add, but with a wider near-viewing area than for the lens illustrated in FIG. 7. The alternate back lens surface (shown by the dashed line and right-hand y-axis values cooperates with the front lens surface illustrated in FIG. 4 to create a lens with the through-power profile shown by the solid line and left-hand y-axis values.
Figure 12:
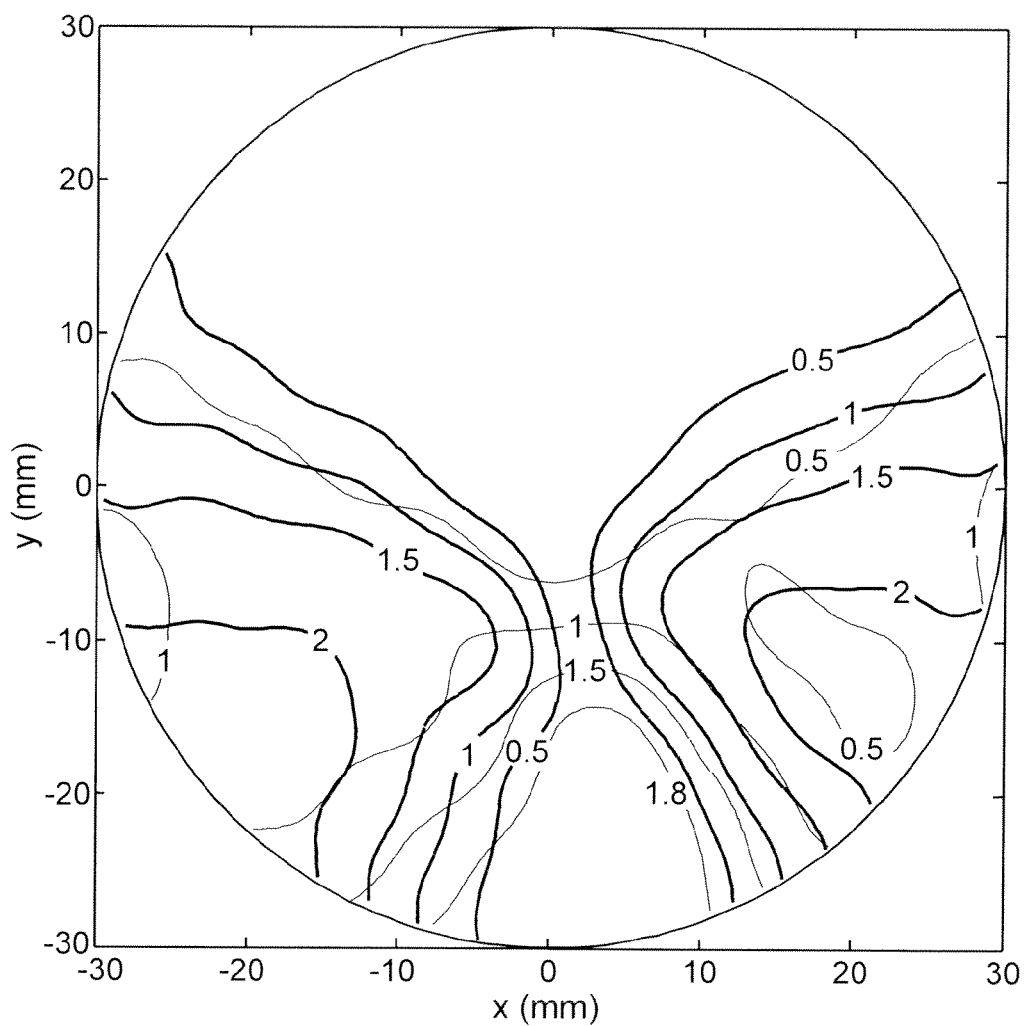
FIG. 12 shows the sphere and cylinder contour plot (in diopters) for calculated through-power readings of the exemplary lens of the invention illustrated in FIG. 11. Light line contours identify spherical power values and heavy line contours identify cylinder power of the lens.

Again, the power gradation surface illustrated in FIGS. 1 and 4 was used for the front surface of this exemplary lens. FIG. 11 shows the surface power profile for the back lens surface (dashed line and right-hand axis) and the calculated through-power of the final lens (solid line and left-hand axis) along a typical line of sight for presbyopic viewing from the top of this lens (30 mm) to the bottom of the lens (−30 mm). The through-power plot shows the desired stabilized optical power areas for both zero diopters distance-viewing correction and +2 D add power. The shape of this back surface profile is similar to those in the previous Examples, but has a surface power value of about −3.15 D at −10 mm, in comparison to the smaller values observed in the previous examples. In addition, the back surface power changes slightly more across this lens' add area than the back surface used in EXAMPLE 1.

The calculated through-power contour plot associated with this lens (FIG. 12) clearly shows as in previous Examples a large effective area of stabilized power for the distance-viewing value, and in addition, a wider effective near-viewing stabilized area (bounded by the 1.8 D contour) than the corresponding area on the lens of EXAMPLE 1. In this design, like EXAMPLE 2, the 0.5 D sphere (light lines) and cylinder contours (heavy lines) extend farther up the lens than for EXAMPLE 1, and the areas with higher cylinder readings, such as unwanted cylinder of 2 D, are larger. Yet such design tradeoffs may be acceptable since a broader, larger near-distance viewing area is gained for EXAMPLE 3.

Surprisingly, the surfaces to be combined with the power gradation surface in EXAMPLES 1-3 appear different from either standard single vision or progressive surfaces. The unusual power variations and multiple changes across the lens of increasing or decreasing power were noted above. Most progressive surfaces try to limit any cylinder in the distance-viewing region of the lens, but this limitation was not required for the surfaces used in EXAMPLES 1-3. For example, the back surface power map plotted in FIG. 6 shows a narrowed corridor bounded by the 0.5 D cylinder contour (heavy lines), and a large area in the top half of the lens with cylinder values of 0.5-1.0 D. However, in combination with a surface such as shown in FIG. 4, it appears that cylinder on the opposite lens surface can be used to advantage to broaden the resultant distance-viewing area of the final lens, as illustrated in FIG. 7. The opposite surfaces that combine with a continuous power gradation surface according to this invention have another advantage. Since their cylinder components can be more extensive over the lens surface (in contrast to progressive lens surfaces), the power changes can be more gradual and therefore easier to create by either conventional or digital surfacing. In a preferred embodiment, gradual changes over substantially the entire other surface cooperate with the continuous power gradation surface to create the final prescription. Thus, it is clear that for the invention, both surfaces often must take on innovative configurations to create the desired combination.

The previous examples illustrate some of the variations in final lens design that can be achieved with the current invention for one given prescription. Such variation of final lens properties would be extremely difficult to realize with standard progressive lens blanks, because of their pre-set regions of given add power and distance clear viewing area. The continuous power gradation surface can provide broader regions adaptable to various design requests or user preferences, as shown in EXAMPLES 1-3.

The following example illustrates how the same continuous power gradation surface can be used to create a different prescription.

EXAMPLE 4

Figure 13:
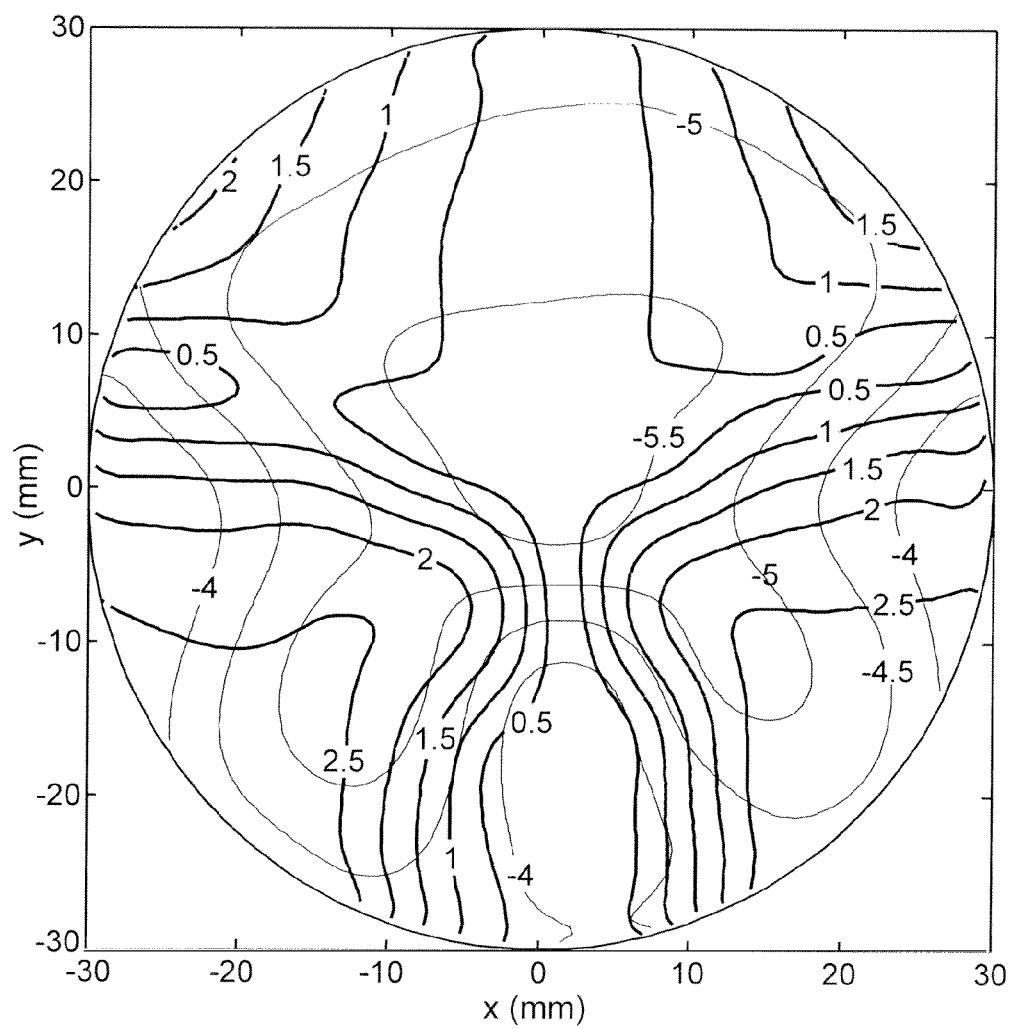
FIG. 13 shows the power contour plot (in 0.5 D increments) of another alternative back lens surface that will combine with the lens surface of FIG. 4 to form a final lens with a distance power of −2 D and a +3 D add power. Light line contours show spherical power, and heavy line contours show cylinder power changes on this lens surface.

In this instance, the surface illustrated in FIGS. 1 and 4 was used as a front lens surface, and combined with yet another back lens surface to provide a final lens according to the invention with −2 diopters correction in the distance, and +3 diopters add power in the near-viewing area. The form of mathematical representations of the surfaces and the optimization approach were the same as used in the previous EXAMPLES, and the fitting parameters of EXAMPLE 1 were used. FIG. 13 shows the surface contour power plot for the back surface that combines with the power gradation surface to achieve these prescription requirements. This back lens surface shows high and rapidly varying spherical power (light contour lines) in addition to more cylinder power changes (heavy contour lines) than in the previous examples.

Figure 14:
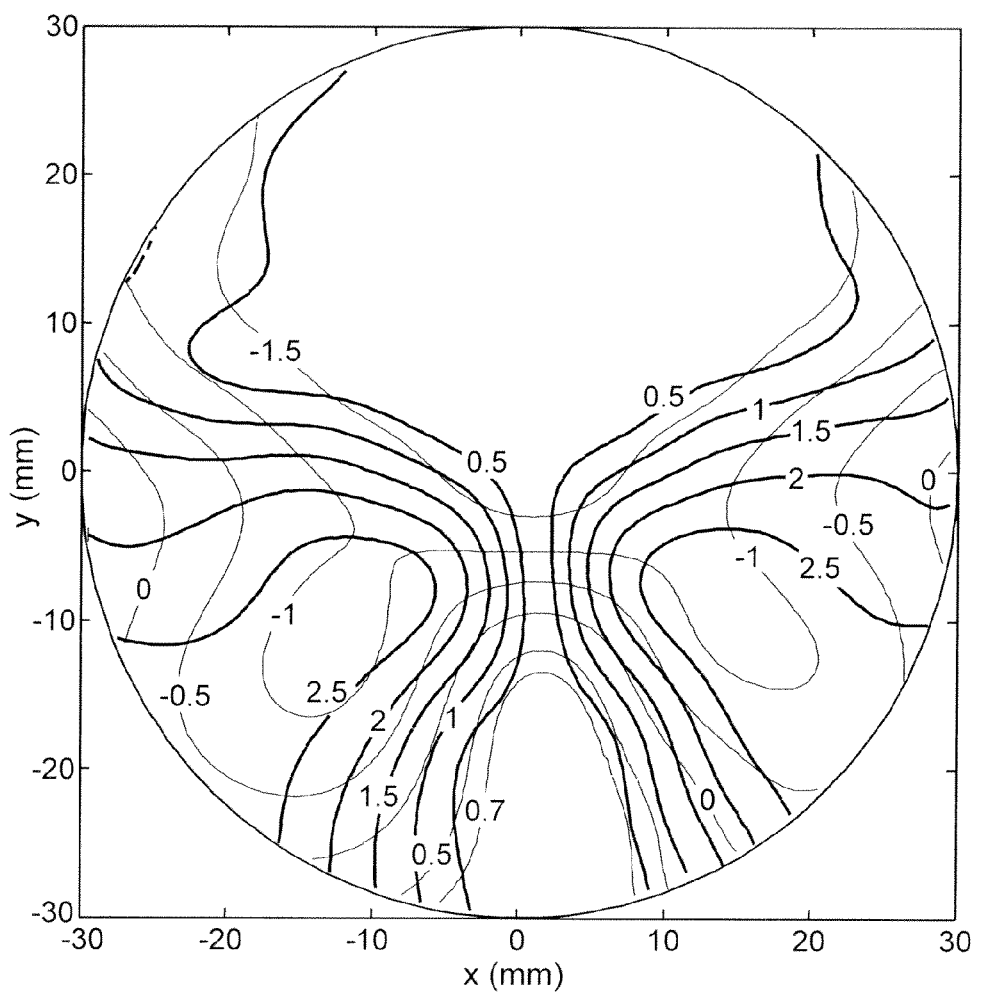
FIG. 14 shows the sphere and cylinder contour plot (in diopters) for calculated through-power readings on an exemplary lens of the invention for a prescription requiring a distance power of −2 D and an +3 D add power and formed by the cooperation of the lens surfaces illustrated in FIGS. 4 and 13. Light line contours identify spherical power values and heavy line contours identify cylinder power of the lens.

FIG. 14 shows the calculated power contour plot of expected through-power readings for the exemplary lens created by this combination of surfaces. A large effective stabilized distance-viewing region has been created by this combination of surfaces in the upper half of the lens, bounded by the −1.5 D sphere contour and the 0.5 D cylinder limit. This large area will have an optical power near the prescribed −2 D value. The near-viewing area of the lens created by combining these two surfaces is enclosed by the 0.7 D spherical contour line. This corresponds to an add power of at least +2.7 D, or 90% of the expected add (−2 D distance Rx+2.7 D near Rx=0.7 D effective value).

Figure 15:
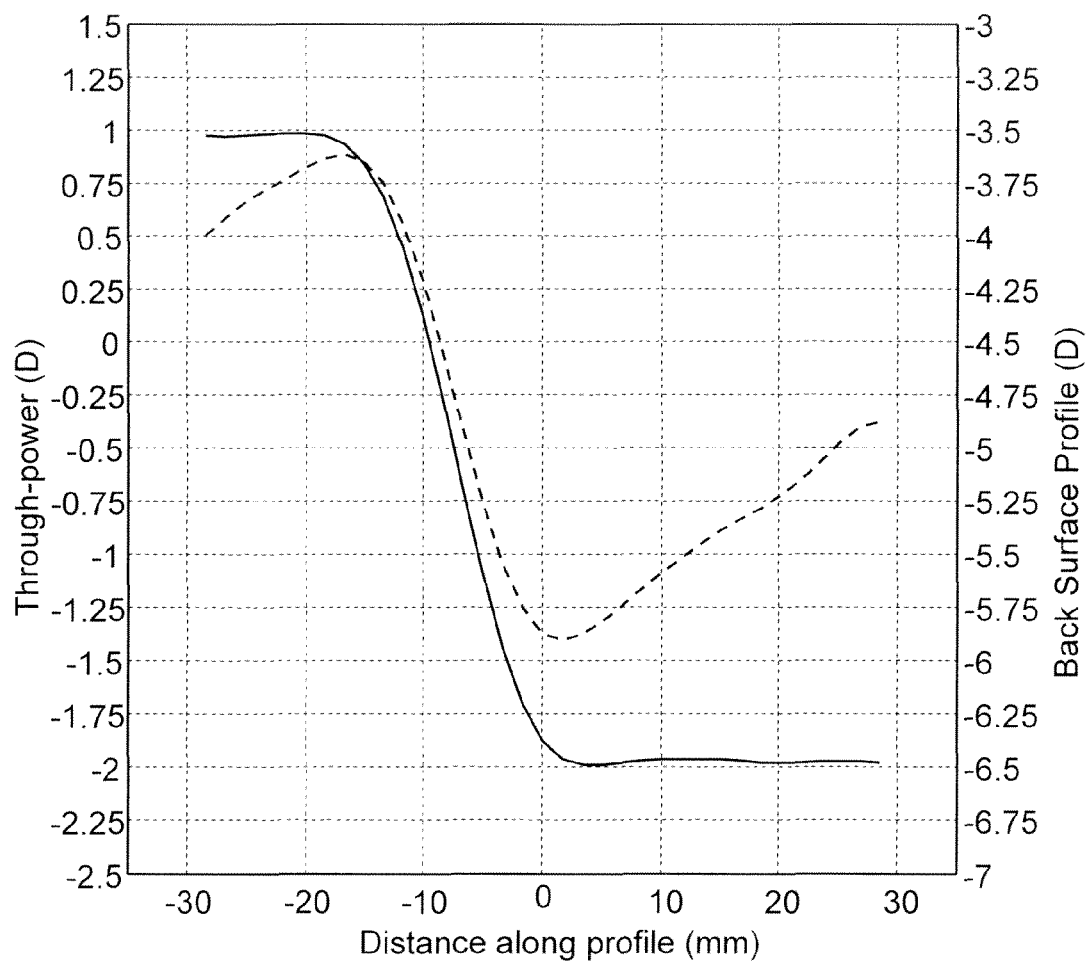
FIG. 15 shows (dotted line and right-hand y-axis values) the surface power profile for the surface of FIG. 13 and the through-power profile (solid line and left-hand y-axis values) for the final lens shown in FIG. 14 along a typical line of sight for presbyopic viewing from the top of the lens (30 mm) to the bottom of the lens (−30 mm).

The power profiles for this lens are shown in FIG. 15. As in the previous Examples, the profile starts at the top of lens (30 mm) and runs along a presbyopic line of sight from the distance-viewing area through the near-viewing area to the bottom of the lens (−30 mm). The solid line of calculated through-power for this lens clearly shows a plateau of stabilized power at −2 D for the distance-viewing correction, and another plateau of stabilized power at about 1 D in the near-viewing area corresponding to the +3 D add requirement. The back surface combined with the surface of FIG. 4 to create this lens shows an unusual undulating power profile similar to the previous Examples, but with different surface power values and larger relative changes (dashed line and right-hand axis in FIG. 15). To achieve a minus power in the distance-viewing area, the back surface must provide significantly more power than in the previous Examples, and change more quickly to cooperate with the power gradation increase of the front surface. Similarly, one finds that the back surface power changes more along its profile from −10 mm to −30 mm than in the previous Examples, and in this cooperative manner, the two surfaces creates a higher, stabilized add area for the final lens without either surface showing an effective stabilized area of their own.

These calculations illustrate examples of the different ways a single continuous power gradation surface can be combined with various other surfaces. One of skill in the art will understand that if such variations in prescription and in lens characteristics can be created with one exemplary power gradation surface, the use of other power gradation surfaces on either side of the lens can likewise enable a variety of different prescriptions, as well as address various optical, cosmetic or practical performance factors.

The following example illustrates the use of a continuous power gradation surface for single vision lenses.

EXAMPLE 5

The goal in this Example was to design a lens according to the present invention with a spherical power of −4.25 D, a cylinder power of +1 D and a cylinder axis of 180°. Such a prescription is fairly common, but can be particularly challenging to adapt into wrap frames that often require higher base curves normally associated with plus prescriptions. One advantage of the continuous power gradation design is that the spherical curvature of the lens surface can be chosen to increase across the lens. This feature may be used to advantage, for example, in fitting the lens into a wrapped frame. The following standard fitting parameters were used in the calculations: distance from the cornea of the eye to the lens' back surface vertex (cornea) vertex distance): 13 mm, face frame (wrap) angle of 15 degrees, and a pantoscopic tilt of 4 degrees. The method of mathematical representation of the surfaces and the optimization approach used in previous Examples was also used for EXAMPLE 5.

Figure 16:
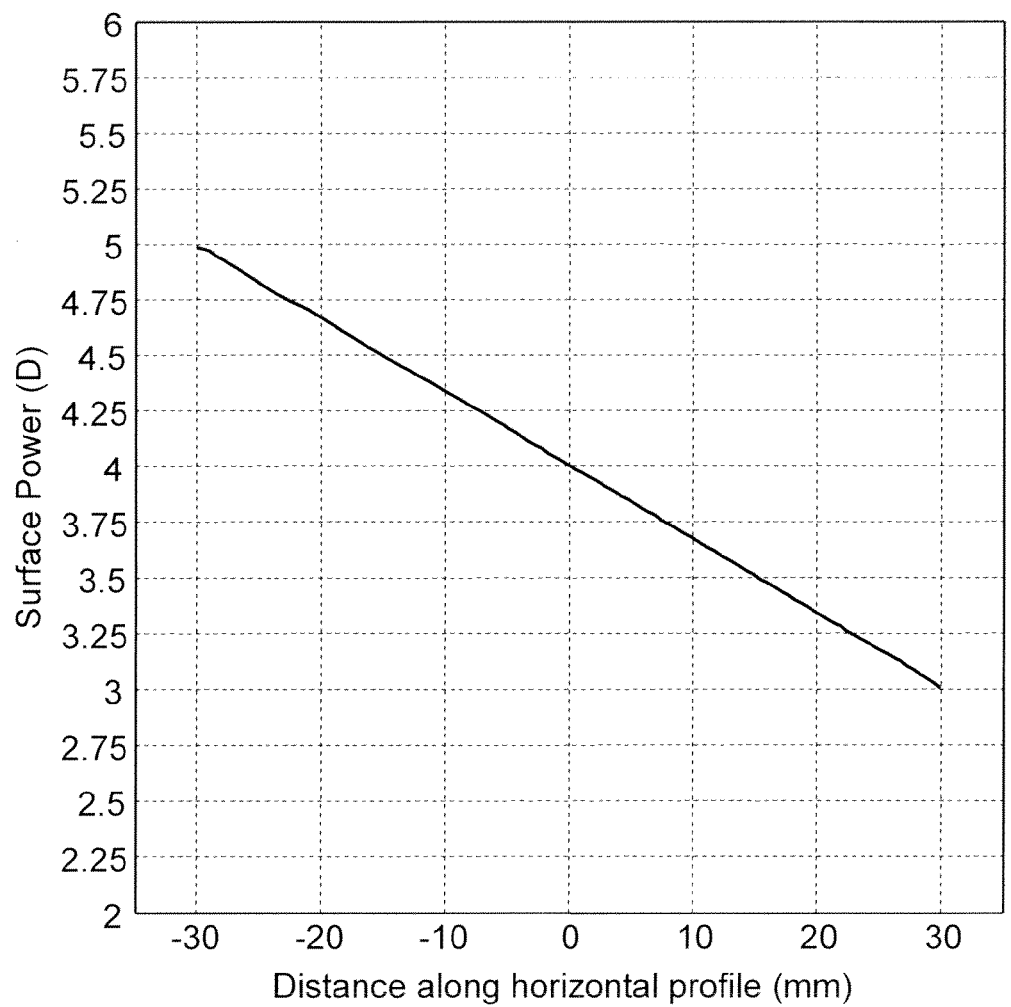
FIG. 16 shows the surface power profile along the horizontal axis at y=0 from the nasal edge of the lens (30 mm) to the temporal edge of the lens (−30 mm) for a lens surface illustrated in FIG. 5.

The continuous power gradation surface as illustrated in FIG. 5 was used in this Example as the outer surface of the lens. Note that the power increase proceeds laterally across the lens from side to side for this surface of the invention, rather than from the top to the bottom of the lens. The power gradation increase, as can be seen by the spherical power contours (light lines) in FIG. 5, was aligned such that power increased along the 0-180 axis toward the temples (−30 mm). FIG. 16, which traces this surface's power profile plot along the 0-180 axis, confirms that the surface shown in FIG. 5 comprises no discontinuities or inflection points.

Figure 17:
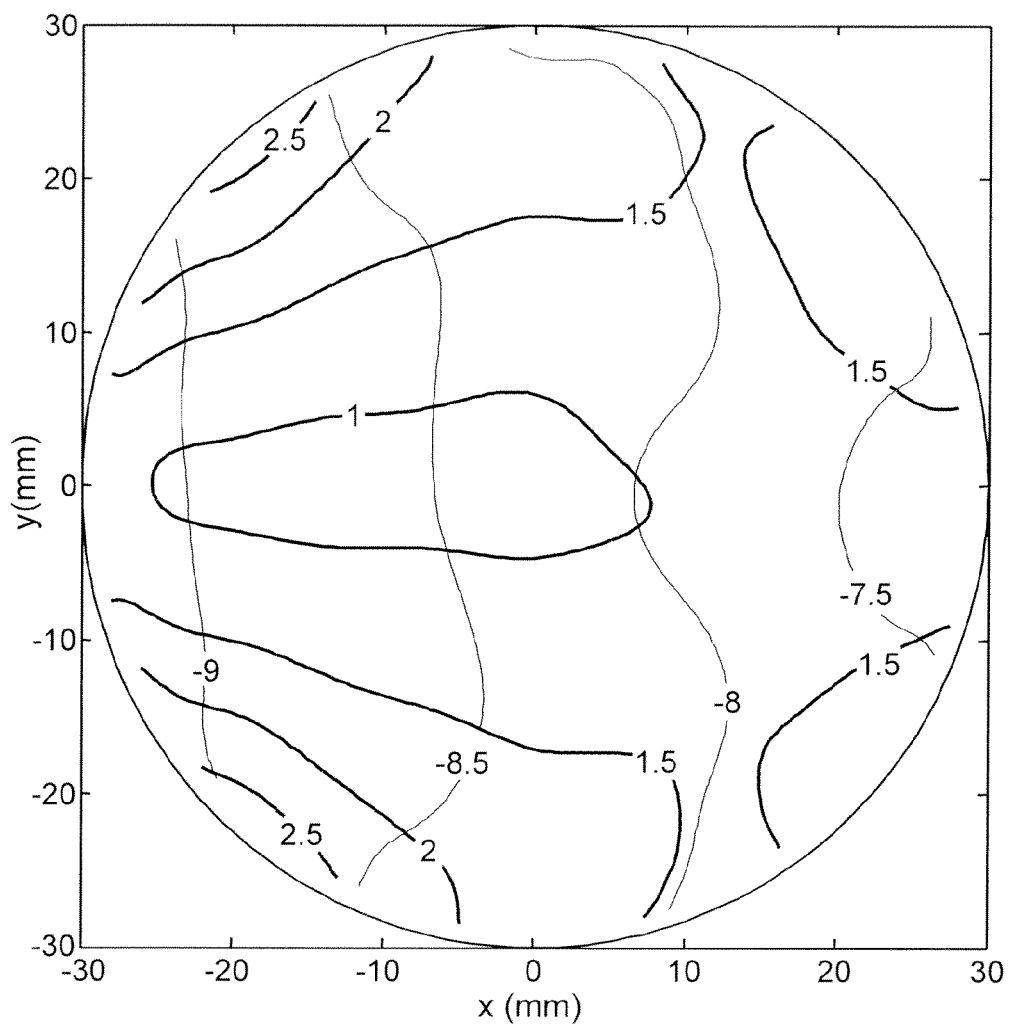
FIG. 17 shows the power contour plot (in 0.5 D increments) for the other surface of the lens that will combine with the surface of FIG. 5 to form a single vision lens with a prescription value of −4.25 D spherical power +1 D cylinder power, cylinder axis 180°. Light line contours show spherical power, and heavy line contours show cylinder power changes on the lens surface.

FIG. 17 shows the surface power contour plot for the back lens surface that is combined with the continuous power gradation surface of FIG. 5 to create the specified single vision prescription. This back surface shows a different distribution of cylinder power than the previous examples, consistent with the 180° cylinder axis of the specified prescription. In addition, the spherical power contours (light lines) on this surface describe a much higher minus (highly concave) surface, which is appropriate to accommodate the −4.25 D spherical power of the desired Rx.

Figure 18:
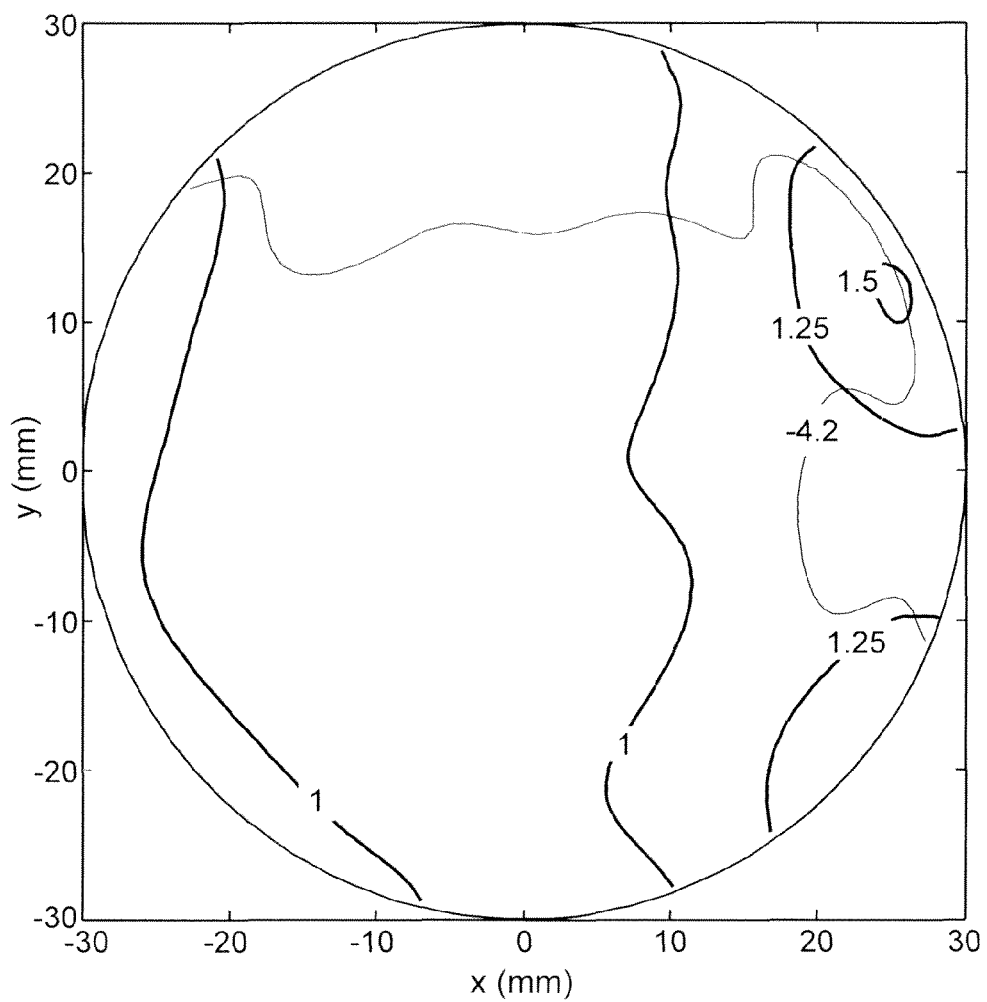
FIG. 18 shows the sphere and cylinder contour plot (in diopters) for calculated through-power readings on an exemplary single vision lens of the invention, created by the combination of the lens surface illustrated in FIGS. 5 and 16 and the other lens surface of FIG. 17. Light line contours identify spherical power values and heavy line contours identify cylinder power of the lens.

FIG. 18 shows the power contour plot corresponding to the calculated through-power values of the exemplary lens created by the combined surfaces of FIG. 5 and FIG. 17. A very extensive area with both the correct spherical and cylinder prescription values is created by the cooperation of these two surfaces, and this area extends well toward the temporal portion of the lens (−y values).

The power profiles calculated for this lens confirm these results. FIG. 19 traces the surface power profile of the back surface (dashed line and right-hand y-axis values) and the calculated through-power of the lens (solid line and left-hand y-axis values). In this Example, the profile line is centered on the lens (at y=0 as seen in FIG. 18) and proceeds from the nasal edge of the lens (30 mm) to the temporal edge of the lens (−30 mm). The through-power profile shows good agreement with the desired prescription value across the lens, illustrating that a very large effective area of stabilized optical power has been created by this combination of lens surfaces. In this Example, the back surface power profile (dashed line in FIG. 19) resembles an alternative continuous power gradation surface, and its corresponding contour map illustrated in FIG. 17 shows this surface includes significant changes in cylinder values as well as spherical power.

The extensive effective area with correct prescription on this exemplary lens is particularly worthy of note and an advantageous design for wrap-style frames that otherwise present a large portion of the lens to the wearer at oblique angles. The designed additional curvature of the continuous power gradation surface means more of the lens surface is presented perpendicular to the eye, and this allows better correction of the vision and less angular distortion. Surprisingly, despite the fact that gradually increasing power is not required for a single vision wrap-style lens, the use of the power gradation surface provides a very successful optical solution. In addition, this well-optimized prescription lens has been achieved with a front base curve that ranges from only 3-5 D, instead of the steeper, more bulbous base curves typically used for wrap-style lenses.

Although the invention has been disclosed in detail with reference to preferred embodiments, and multiple variations or derivatives of these embodiments, one skilled in the art will appreciate that additional substitutions, combinations, and modifications are possible without, departing from the concept and scope of the invention. These and similar variations would become clear to one of ordinary skill in the art after inspection of the specification and the drawings herein. Accordingly, the invention is identified by the following claims.

We claim:

1. An ophthalmic lens providing a desired prescription, comprising:
   a first lens surface having a useable optical area and a second lens surface on the opposite side of the lens from the first lens surface,
   wherein the first lens surface comprises a continuous, gradual change in optical power over substantially the entire useable optical area, wherein the continuous, gradual change in optical power comprises a change in spherical power and increases without inflection points or discontinuities from one edge of the useable optical area to substantially the opposite edge of the useable optical area; and
   wherein the second lens surface is configured to cooperate with the first lens surface such that the lens provides the desired prescription, including at least a first effective area of stabilized optical power.

2. An ophthalmic lens as defined by claim 1, wherein the change in optical power of the first lens surface increases from the top of the lens to the bottom of the lens.

3. An ophthalmic lens as defined in claim 1, wherein the first lens surface is the lens surface farthest away from the wearer.

4. An ophthalmic lens as defined in claim 1, wherein the first lens surface is the lens surface nearest the wearer's eye.

5. An ophthalmic lens as defined in claim 1, wherein the first lens surface and second lens surface cooperate to provide a single vision correction for the desired prescription.

6. An ophthalmic lens as defined in claim 1, wherein the first lens surface and second lens surface cooperate to provide a first area for distance-viewing and a second area of near-viewing for the desired prescription.

7. An ophthalmic lens as defined in claim 6, wherein the first and second areas comprise two different optical powers for the desired prescription.

8. An ophthalmic lens as defined in claim 1, wherein the continuous, gradual change in optical power on the first lens surface contains an umbilical line.

9. An ophthalmic lens as defined in claim 1, wherein the continuous, gradual change in optical power on the first lens surface further comprises a change in cylinder power.

10. An ophthalmic lens as defined in claim 1, wherein the continuous, gradual change in optical power on the first lens surface comprises a linear increase in power.

11. An ophthalmic lens as defined in claim 1, wherein the continuous, gradual change in optical power on the first lens surface comprises a non-linear increase in power.

12. An ophthalmic lens as defined in claim 11, wherein the non-linear increase in power is described by an equation selected from the group consisting of exponential, logarithmic, logarithmic spiral, parabolic and positive power function equations.

13. An ophthalmic lens as defined by claim 1, wherein the change in optical power of the first lens surface increases laterally across the lens.

14. An ophthalmic lens for providing a desired prescription having both distance-viewing and near-viewing values, comprising:

a first lens surface having a useable optical area and a second lens surface on the opposite side of the lens from the first lens surface, wherein the first lens surface comprises a continuous, gradual change in optical power over substantially the entire useable optical area, wherein the continuous, gradual change in optical power comprises a linear increase in power and increases without inflection points or discontinuities from one edge of the useable optical area to substantially the opposite edge of the useable optical area; and wherein the second lens surface is configured to cooperate with the first lens surface such that the lens provides the desired prescription, including at least a first effective area of stabilized optical power for distance-viewing and at least a second effective area of stabilized optical power for near-viewing.

15. An ophthalmic lens as defined in claim 14, wherein the first and second effective areas comprise two different optical powers for the desired prescription.

16. An ophthalmic lens as defined in claim 14, wherein the cooperation of the first and second surfaces further comprises optimization for user preferences.

17. An ophthalmic lens as defined in claim 14, wherein the continuous, gradual change in optical power on the first lens surface contains an umbilical line.

18. An ophthalmic lens for providing a desired prescription having both distance-viewing and near-viewing values, comprising:

a first lens surface having a useable optical area and a second lens surface on the opposite side of the lens from the first lens surface, wherein the first lens surface comprises a continuous, gradual change in optical power over substantially the entire useable optical area, wherein the continuous, gradual change in optical power comprises a non-linear increase in power and increases without inflection points or discontinuities from one edge of the useable optical area to substantially the opposite edge of the useable optical area; and wherein the second lens surface is configured to cooperate with the first lens surface such that the lens provides the desired prescription, including at least a first effective area of stabilized optical power for distance-viewing and at least a second effective area of stabilized optical power for near-viewing.

19. An ophthalmic lens as defined in claim 18, wherein the non-linear increase in power is described by an equation selected from the group consisting of exponential, logarithmic, logarithmic spiral, parabolic and positive power function equations.

20. An ophthalmic lens as defined in claim 18, wherein the cooperation of the first and second surfaces further comprises optimization for user preferences.

\* \* \* \* \*

UNITED STATES PATENT AND TRADEMARK OFFICE
CERTIFICATE OF CORRECTION

PATENT NO. : 8,042,941 B2
APPLICATION NO. : 12/697060
DATED : October 25, 2011
INVENTOR(S) : Jose Alonso Fernandez et al.

It is certified that error appears in the above-identified patent and that said Letters Patent is hereby corrected as shown below:

At column 2, line 44, "hook" should be -- book --.

At column 5, line 46, "he" should be -- for the --.

At column 10, line 4, "he" should be -- be --.

At column 11, line 6, "abroad" should be -- a broad --.

At column 11, line 50, "he" should be -- be --.

At column 12, line 14, "atypical" should be -- a typical --.

At column 13, line 2, "he" should be -- be --.

At column 16, line 2, "he" should be -- be --.

At column 17, line 17, "he" should be -- be --.

At column 22, line 28, "hack" should be -- back --.

At column 23, line 1, "cornea" should be -- corneal --.

Signed and Sealed this
Twenty-seventh Day of March, 2012

David J. Kappos
*Director of the United States Patent and Trademark Office*